United States Patent [19]
Ishikawa et al.

[11] Patent Number: 5,838,671
[45] Date of Patent: Nov. 17, 1998

[54] METHOD AND APPARATUS FOR CALL ADMISSION CONTROL IN CDMA MOBILE COMMUNICATION SYSTEM

[75] Inventors: Yoshihiro Ishikawa; Narumi Umeda, both of Yokohamashi, Japan

[73] Assignee: NTT Mobile Communications Network Inc., Tokyo, Japan

[21] Appl. No.: 665,407

[22] Filed: Jun. 18, 1996

[30] Foreign Application Priority Data

Jun. 23, 1995 [JP] Japan .................................... 7-158036
Sep. 20, 1995 [JP] Japan .................................... 7-241848
Dec. 14, 1995 [JP] Japan .................................... 7-326056

[51] Int. Cl.$^6$ ................................................. H04B 7/216
[52] U.S. Cl. ............................................................... 370/335
[58] Field of Search ................................... 370/319, 320, 370/328, 331, 332, 335, 342, 441, 229, 230, 235, 236; 455/33.1, 33.3, 422; 375/200, 206

[56] References Cited

U.S. PATENT DOCUMENTS

| | | | |
|---|---|---|---|
| 5,404,574 | 4/1995 | Benveniste | 455/33.1 |
| 5,448,761 | 9/1995 | Ushirokawa | 455/62 |
| 5,590,399 | 12/1996 | Matsumoto et al. | 455/33.3 |
| 5,621,752 | 4/1997 | Antonio et al. | 375/200 |
| 5,623,484 | 4/1997 | Muszynski | 370/335 |
| 5,671,218 | 9/1997 | I et al. | 370/252 |
| 5,687,171 | 11/1997 | Shin et al. | 370/335 |

OTHER PUBLICATIONS

IEEE Journal on Selected Areas in Communications, vol. 12, No. 4, May 1994, pp. 638–644, Zhao Liu, et al., "SIR–Based Call Admission Control for DS–CDMA Cellular Systems".

IEEE Journal on Selected Areas in Communications, vol. 11, No. 6, Aug. 1993, pp. 892–900, Audrey M. Viterbi, et al., "Erlang Capacity of a Power Controlled CDMA System".

*Primary Examiner*—Ajit Patel
*Attorney, Agent, or Firm*—Oblon, Spivak, McClelland, Maier & Neustadt, P.C.

[57] ABSTRACT

A call admission control scheme for a CDMA mobile communication system which can satisfy a given connection quality (blocking probability) while guaranteeing a predetermined communication quality. At each base station, a blocking probability and an outage probability of communication quality at each base station are calculated to adjust a maximum number of simultaneously connectable users at each base station according to the calculated results, and a call admission control is carried out according to the adjusted maximum number of simultaneously connectable users. A maximum number of simultaneously connectable users or an interference threshold can be determined from a first relationship between an offered traffic and a maximum number of simultaneously connectable users or an interference threshold for guaranteeing the prescribed communication quality and a second relationship between an offered traffic and a maximum number of simultaneously connectable users or an interference threshold for satisfying the prescribed blocking probability, and used for the call admission control.

50 Claims, 18 Drawing Sheets

METHOD AND APPARATUS FOR CALL ADMISSION CONTROL IN CDMA MOBILE COMMUNICATION SYSTEM

BACKGROUND OF THE INVENTION

1. Field of the Invention

The present invention relates to a method and an apparatus for a call admission control in a mobile communication among a plurality of base stations and a plurality of mobile stations which carry out communications using CDMA (Code Division Multiple Access) scheme.

2. Description of the Background Art

A well known example of the currently available portable telephone or automobile telephone system is the cellular system which provides a service by distributing many base stations within its service area, while setting a radius of a radio zone serviced by each base station to be about several Km.

In general, in the mobile communication system which utilizes a limited radio frequency bandwidth, there is a trade-off between the communication quality and the system capacity (a maximum offered traffic that can satisfy a predetermined blocking probability).

In the conventional system using FDMA (Frequency Division Multiple Access) scheme or TDMA (Time Division Multiple Access) scheme which fixedly allocates channels to each base station, a reuse distance for an identical channel or adjacent channels is set to such a value which defines a tolerable limit for the CIR (Carrier to Interference power Ratio) determined from a required communication quality, and which makes a positional outage probability of CIR below a prescribed limit.

By making this reuse distance shorter, a number of channels that can be allocated to each base station can be increased so that a system capacity can be increased, but an outage probability of communication quality becomes high. On the contrary, by making this reuse distance longer, an outage probability of communication quality can be suppressed low, but a number of channels that can be allocated to each base station decreases so that a system capacity becomes small.

The same situation is also encountered in so called DCA (Dynamic Channel Assignment) which assigns channels dynamically to each call. In DCA, whether a particular channel is usable at a particular base station is judged according to the reuse distance, the measured interference level, etc.

In the system using FDMA or TDMA scheme, the judgement as to whether a particular channel is usable or not according to the interference level is conceptually equivalent to the judgement according the reuse distance. When the condition for making this judgement is relaxed (i.e., using a shorter reuse distance or a higher threshold for the interference level), a system capacity can be increased, but an outage probability of communication quality becomes high.

As such, in the convention system using FDMA or TDMA scheme, the reuse distance or a threshold for the interference level for guaranteeing the communication quality is determined in advance, and then, the channel distribution is designed according to the traffic state of each base station.

On the other hand, in CDMA scheme, the identical radio frequency bandwidth is shared among many users as each the users use mutually different spread codes, and a channel is formed from the spread code.

In the communication system using this CDMA scheme, all the other communications which use the identical frequency bandwidth will cause the interference. Namely, when the identical frequency bandwidth is used for all the cells, a very large number of communications made by all the cells can be sources of interference, and regardless of which spread code is used for a communication by a user, the communication quality will be determined by a total interference level.

Consequently, even if the CDMA system is made to use the identical spread code only at geographically distanced locations, by applying the same method for guaranteeing the communication quality according to the channel reuse distance as in the conventional FDMA or TDMA system, the CIR will be degraded if there is a large amount of interference from communications using different spread codes at neighboring base stations, so that the communication quality in the CDMA system cannot be guaranteed in this manner.

For this reason, in order to guarantee the communication quality in the CDMA system, it is necessary to reduce a number of sources of interference. As a technique for suppressing the interference level, various techniques such as the sectorization and the voice activation are known, but in order to suppress the interference level below a reference value under the given condition associated with such a technique, it is going to be necessary to limit a number of users who can set up connections simultaneously.

For example, A. M. Viterbi and A. J. Viterbi, "Erlang Capacity of a Power Controlled CDMA System", IEEE Journal on Selected Areas in Communications, Vol. 11, No. 6, pp. 892–900, August 1993, disclose the call admission control method in which a threshold for the interference level is determined in advance, and the admission of a call is refused if the interference level observed at a time of an occurrence of a call exceeds this predetermined threshold. In this paper, a relationship between the offered traffic and the blocking probability is obtained by calculating the time congestion probability approximately. However, this paper only obtains the relationship between the blocking probability and the offered traffic, so that the communication quality cannot be guaranteed by the call admission control method of this paper.

Thus, for the CDMA mobile communication, there was no conventionally known call admission control method which is capable of satisfying a given blocking probability while guaranteeing a predetermined outage probability of communication quality.

SUMMARY OF THE INVENTION

It is therefore an object of the present invention to provide a method and an apparatus for a call admission control in the CDMA mobile communication system, which can flexibly deal with a traffic variation or a propagation state change, and which can satisfy a given connection quality (blocking probability) while guaranteeing a predetermined communication quality.

It is another object of the present invention to provide a method and an apparatus for a call admission control in the CDMA mobile communication system, which can satisfy a given connection quality (blocking probability) while guaranteeing a predetermined communication quality, by means of distributed autonomous control at each base station.

According to one aspect of the present invention there is provided a method of call admission control in a CDMA mobile communication system having a plurality of base stations and mobile stations, the method comprising the steps of: calculating at each base station a blocking probability and an outage probability of communication quality within a radio zone of each base station; adjusting at each base station a maximum number of simultaneously connectable users within a radio zone of each base station according to the blocking probability and the outage probability of communication quality calculated at the calculating step; and carrying out at each base station a call admission control for each new call occurred within a radio zone of each base station according to the maximum number of simultaneously connectable users adjusted at the adjusting step.

According to another aspect of the present invention there is provided an apparatus for call admission control in a CDMA mobile communication system having a plurality of base stations and mobile stations, the apparatus comprising: first control means, provided at each base station, for calculating a blocking probability and an outage probability of communication quality within a radio zone of each base station, and adjusting a maximum number of simultaneously connectable users within a radio zone of each base station according to the calculated blocking probability and outage probability of communication quality; and second control means, provided at each base station, for carrying out a call admission control for each new call occurred within a radio zone of each base station according to the maximum number of simultaneously connectable users adjusted by the first control means.

According to another aspect of the present invention there is provided a method of call admission control in a CDMA mobile communication system having a plurality of base stations and mobile stations, the method comprising the steps of: obtaining a maximum offered traffic for satisfying a prescribed blocking probability while guaranteeing a prescribed communication quality, from a first relationship between an offered traffic and a maximum number of simultaneously connectable users for guaranteeing the prescribed communication quality and a second relationship between an offered traffic and a maximum number of simultaneously connectable users for satisfying the prescribed blocking probability; determining a maximum number of simultaneously connectable users for satisfying the prescribed blocking probability with respect to a given offered traffic not greater than the maximum offered traffic obtained at the obtaining step, from the second relationship; and carrying out a call admission control for each new call according to the maximum number of simultaneously connectable users determined at the determining step.

According to another aspect of the present invention there is provided a method of call admission control in a CDMA mobile communication system having a plurality of base stations and mobile stations, the method comprising the steps of: obtaining a maximum offered traffic for satisfying a prescribed blocking probability while guaranteeing a prescribed communication quality, from a first relationship between an offered traffic and an interference threshold for guaranteeing the prescribed communication quality and a second relationship between an offered traffic and an interference threshold for satisfying the prescribed blocking probability; determining an interference threshold for satisfying the prescribed blocking probability with respect to a given offered traffic not greater than the maximum offered traffic obtained at the obtaining step, from the second relationship; and carrying out a call admission control for each new call according to the interference threshold determined at the determining step.

According to another aspect of the present invention there is provided an apparatus for call admission control in a CDMA mobile communication system having a plurality of base stations and mobile stations, the apparatus comprising: a memory for storing a maximum number of simultaneously connectable users, predetermined by obtaining a maximum offered traffic for satisfying a prescribed blocking probability while guaranteeing a prescribed communication quality, from a first relationship between an offered traffic and a maximum number of simultaneously connectable users for guaranteeing the prescribed communication quality and a second relationship between an offered traffic and a maximum number of simultaneously connectable users for satisfying the prescribed blocking probability, and determining a maximum number of simultaneously connectable users for satisfying the prescribed blocking probability with respect to a given offered traffic not greater than the obtained maximum offered traffic, from the second relationship; and call admission control means for carrying out a call admission control for each new call according to the maximum number of simultaneously connectable users stored in the memory.

According to another aspect of the present invention there is provided an apparatus for call admission control in a CDMA mobile communication system having a plurality of base stations and mobile stations, the apparatus comprising: a memory for storing an interference threshold, predetermined by obtaining a maximum offered traffic for satisfying a prescribed blocking probability while guaranteeing a prescribed communication quality, from a first relationship between an offered traffic and an interference threshold for guaranteeing the prescribed communication quality and a second relationship between an offered traffic and an interference threshold for satisfying the prescribed blocking probability, and determining an interference threshold for satisfying the prescribed blocking probability with respect to a given offered traffic not greater than the obtained maximum offered traffic, from the second relationship; and call admission control means for carrying out a call admission control for each new call according to the interference threshold stored in the memory.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 6, the first embodiment of a method and an apparatus for a call admission control in the CDMA mobile communication system according to the present invention will be described in detail.

Figure 1:
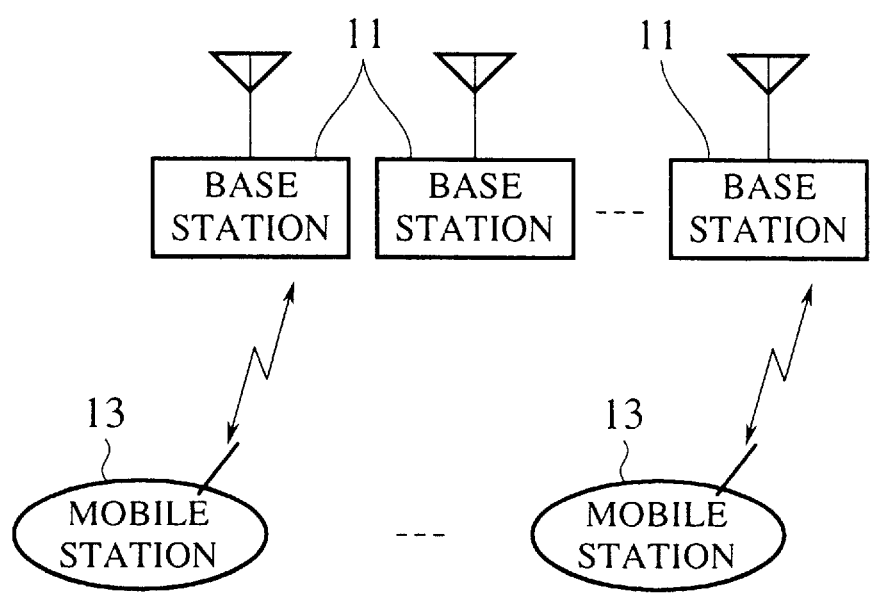
FIG. 1 is a schematic diagram of a CDMA mobile communication system using a method and an apparatus for a call admission control according to the present invention.

In this first embodiment, the CDMA mobile communication system has a schematic configuration as shown in FIG. 1, which comprises a plurality of base stations 11 and a plurality of mobile stations 13 which carry out communications through the base stations 11 using the CDMA scheme for modulating communication signals by one or more spread codes. Here, it is assumed that each base station 11 uses a frequency bandwidth shared by a plurality of user for each of an upward link (for a transmission from the mobile station 13 to the base station 11) and a downward link (for a transmission from the base station 11 to the mobile station 13), and that all the base stations 11 use the identical frequency bandwidth.

Figure 2:
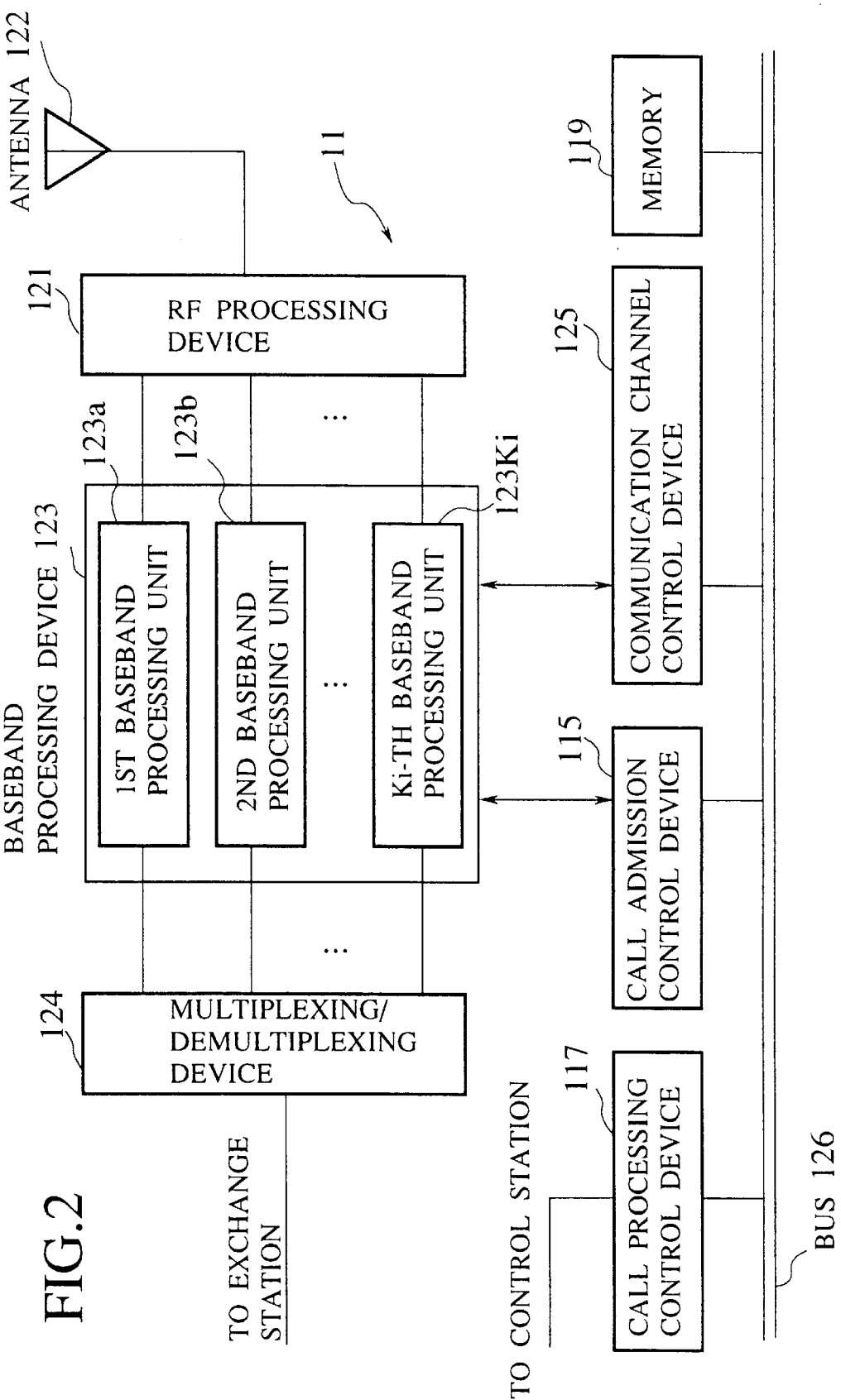
FIG. 2 is a partial functional block diagram of a base station related to a call admission control in the first embodiment of the present invention.

Each base station 11 in this first embodiment has a partial functional configuration related to the call admission control as shown in FIG. 2. Each base station 11 also has a usual configuration for the other usual functions of the base station in the CDMA mobile communication system, which should be well known to those skilled in the art so that its description will be omitted here.

In the functional configuration of FIG. 2, each base station 11 has a section for transmitting and receiving user data via radio, including an RF processing device 121 connected with an antenna 122, a baseband processing device 123 containing Ki sets of baseband processing units 123a to 123Ki and connected with the RF processing device 121, and a multiplexing/demultiplexing device 124 connected with the baseband processing device 123. The multiplexing/demultiplexing device 124 is also connected with an exchange station so as to function as an interface for multiplexing/demultiplexing the user data of a plurality of users.

Each base station 11 also has a section for controlling the baseband processing device 123 and realizing the call admission control, including a call admission control device 115, a call processing control device 117, a communication channel control device 125, and a memory 119, which are connected with each other through a bus 126. The call processing control device 117 is connected with a control station for controlling the base stations, while the call admission control device 115 and the communication channel control device 125 are connected with the baseband processing device 123.

The call admission control device 115 reads, updates, and writes data stored in the memory 119 according to a request from the call processing control device 117, and manages spread codes used by the mobile stations 13 which are currently carrying out communications through this base station 11. The communication channel control device 125 manages Ki sets of baseband processing units 123. The memory 119 stores data including a utilization state of the spread codes, a number of currently connected users C, and a maximum number of simultaneously connectable users N.

Figure 3:
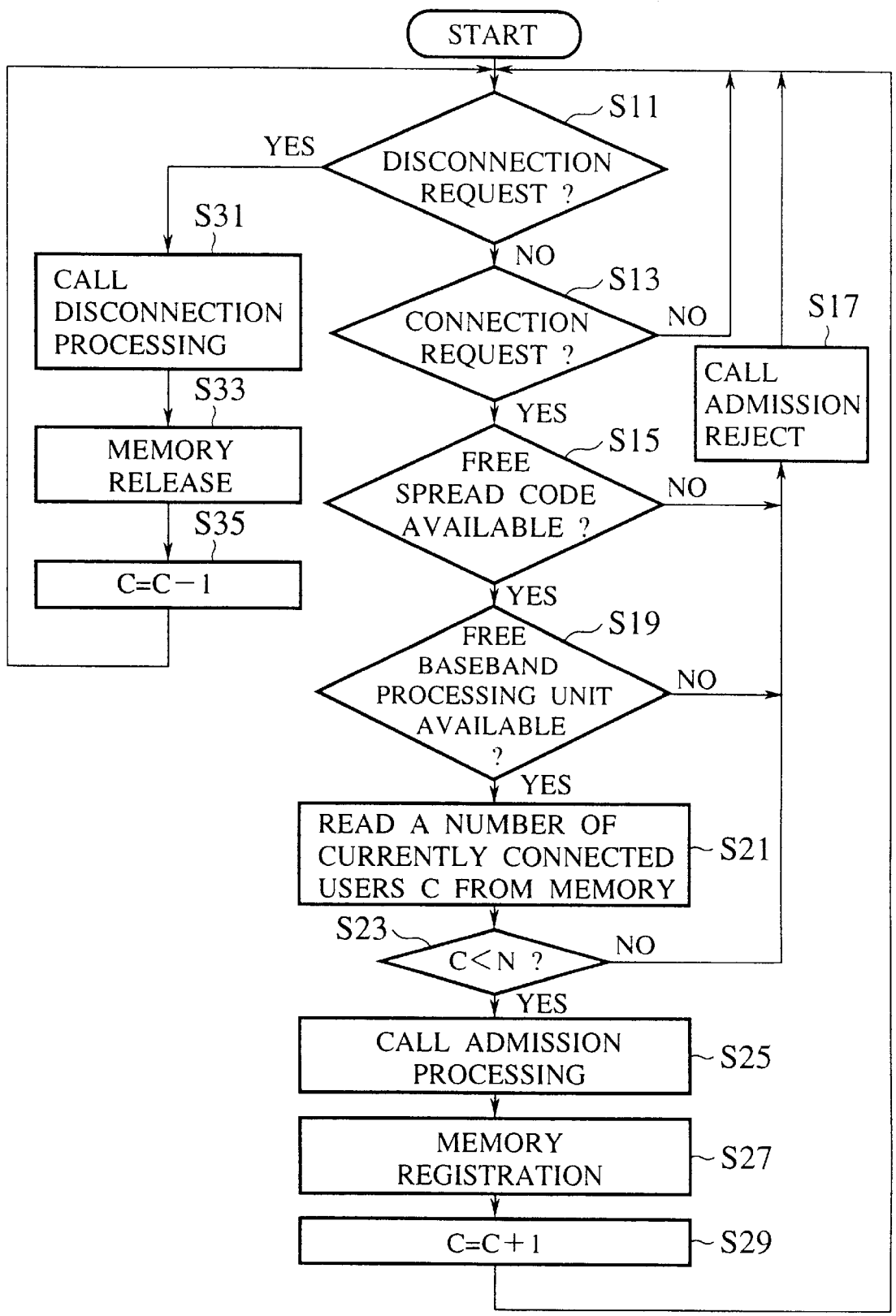
FIG. 3 is a flow chart for a call admission control operation by a call admission control device in the base station of FIG. 2.

In this base station 11 of FIG. 2, the call admission control operation procedure according to the flow chart of FIG. 3 is carried out as follows.

First, when there is a disconnection request from the call processing control device 117 at the step S11, the call admission control device 115 carries out the call disconnection processing by releasing a corresponding baseband processing unit 123 through the communication channel control device 125 at the step S31, and releases the memory 119 by deleting data on a corresponding mobile station 13 on the memory 119 at the step S33. The call admission control device 115 then reduces the number of currently connected users C by one at the step S35, and the operation returns to the beginning.

On the other hand, when there is a connection request for a new call from the call processing control device 117 at the step S13, the call admission control device 115 checks whether a free spread code (a spread code which is currently not in use) is available or not at the step S15. When all the spread codes are currently in use at the step S15, the call admission control device 115 rejects the call admission and notifies this fact to the call processing control device 117 at the step S17, and then the operation returns to the beginning.

When there is an available free spread code at the step S15, the call admission control device 115 inquires the communication channel control device 125 as to whether a free baseband processing unit (a base processing unit 123 which is currently not in use) is available or not at the step S19. When all the baseband processing units 123 are currently in use at the step S19, the communication channel control device 125 notifies this fact to the call processing control device 117 through the call admission control device 115 while the call admission is rejected at the step S17, and the operation returns to the beginning.

When there is an available free transceiver 111 at the step S19, the call admission control device 115 reads out the number of currently connected users C in this base station 11 from the memory 119 at the step S21, and compares this number of currently connected users C with the maximum number of simultaneously connectable users N stored on the memory 119 at the step S23. When N is not greater than C, which occurs only when N is equal to C at the step S23, the call admission control device 115 rejects the call admission and notifies this fact to the call processing control device 117 at the step S17, and then the operation returns to the beginning.

When N is greater than C at the step S23, the call admission control device 115 carries out the call admission processing by allocating the spread code and the baseband processing unit 123 at the step S25, and registers this allocation in the memory 119 at the step S27. The call admission control device 115 then increases the number of currently connected users C by one at the step S29, and the operation returns to the beginning.

When there is no disconnection request or connection request from the call processing control device 117 at the steps S11 and S13, the operation also returns to the beginning.

Now, a manner of setting up the maximum number of simultaneously connectable users N in this first embodiment will be described. Here, for the sake of explanation, a use of the transmission power control based on the reception level is assumed. In addition, taking the voice activation into consideration, it is assumed that each user takes a speech state at a probability (time rate) of $\rho$ and a silent state at a probability of $(1-\rho)$, mutually exclusively.

When a call is assumed to be a random call with an arrival rate $\lambda_0$ (call arrivals per unit time) and a service rate $\mu_0$ (such that $1/\mu_0$ gives an average service time), a probability for the number of simultaneously connected users to be r can be given by the following expression (1).

$$\frac{a^r/(r!)}{\sum_{j=0}^{N}(a^j/j!)} \quad (1)$$

where $a = \lambda_0/\mu_0$. Here, N is the maximum number of simultaneously connectable users, such that a connection in excess of this number will be rejected.

Also, a probability for k out of r connections to be in the speech state can be expressed by the following binomial distribution (2).

$$\begin{bmatrix} r \\ k \end{bmatrix} \rho^k (1-\rho)^{r-k} \quad (2)$$

Therefore, a probability Pk for k users to be in the speech state is given by the following expression (3).

$$P_k = \sum_{r=k}^{N} \begin{bmatrix} r \\ k \end{bmatrix} \rho^k (1-\rho)^{r-k} \frac{a^r/(r!)}{\sum_{j=0}^{N}(a^j/j!)} \quad (3)$$

The communication quality is degraded when a total sum of the interference from the other users in the speech state within the own cell and the interface from the other cells exceeds a certain limit value $C_{max}$. This limit value $C_{max}$ is given by the following expression (4).

$$C_{max} = \frac{pg(1-\eta^{-1})}{E_b/I_{0,req}} \quad (4)$$

where pg is a processing gain, $E_b/I_{0,req}$ is a ratio of an energy per one bit of carrier with respect to an interference, which is determined from the transmission characteristics, and $\eta$ is a parameter corresponding to a transmission power of a mobile station, for which $\eta = I_{0,req}/N_0$ holds for the thermal noise $N_0$.

When a probability density distribution of the other cell interference is set to be $p_{int}(m)$, the outage probability of communication quality $P_{loss}$ is given by the following expression (5).

$$P_{loss} = \frac{\sum_{k=0}^{N} kP_k \int_{C_{max}+1-k}^{\infty} p_{int}(m)dm}{\sum_{k=0}^{N} kP_k} \quad (5)$$

The probability density distribution of the other cell interference $p_{int}(m)$ can be determined by an actual measurement, a theoretical calculation, or a computer simulation.

Figure 4:
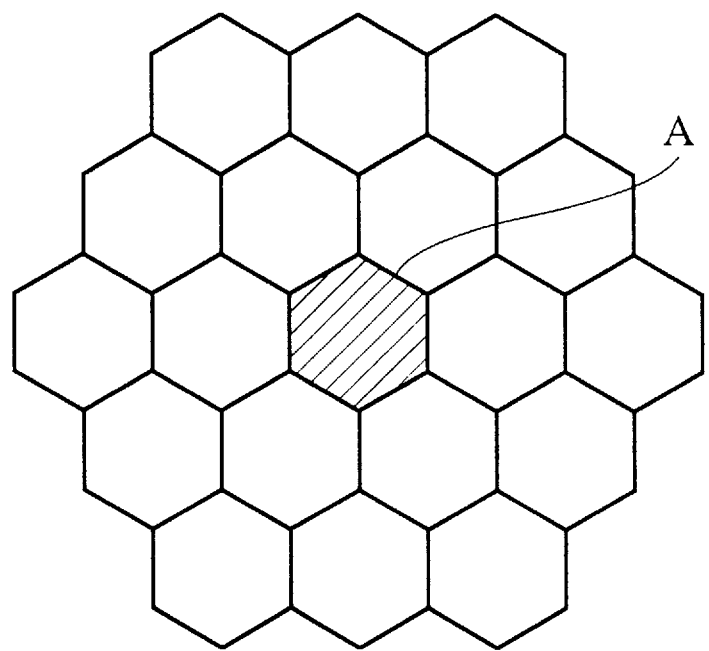
FIG. 4 is a diagrammatic illustration of an exemplary simulation area for a computer simulation of a probability density distribution of the other cell interference used in the first and second embodiments of the present invention.

Here, an exemplary case of using a computer simulation will be described. In this exemplary case, a simulation area was formed by nineteen hexagonal cells and data were sampled at a central cell A as indicated in FIG. 4. The offered traffics at the cells were assumed to be uniform and constant in time, and the settings of a distance attenuation constant $\alpha=4$ and a standard deviation of short term median value variation $\sigma=8$ dB were used. As a result, it was confirmed the distribution of the other cell interference can be well approximated by the Gamma distribution with a mean $0.6a(1-P_{block})\rho$ and a variance $0.23a(1-P_{block})\rho$. Note that the Gamma distribution can be expressed by the following expression (6).

$$p(x) = \frac{1}{\Gamma(v)} \alpha^v x^{v-1} e^{-\alpha x} \quad (6)$$

Figure 5:
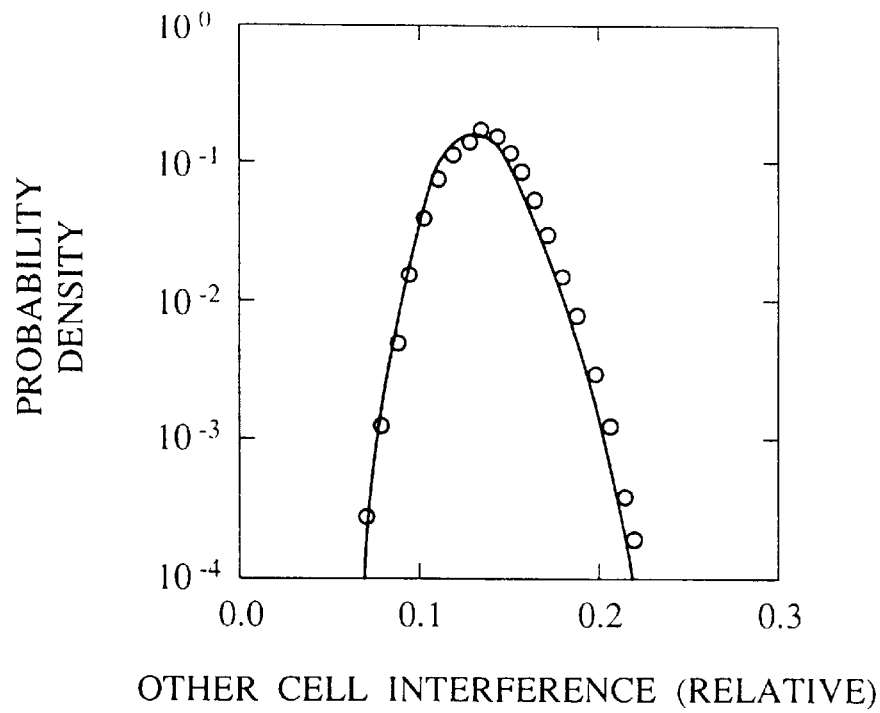
FIG. 5 is a graph showing an example of a probability density distribution of the other cell interference used in the first and second embodiments of the present invention.

FIG. 5 shows an example of the probability density distribution of the other cell interference $p_{int}(m)$, which is a case obtained by using the offered traffic equal to 70 erl/cell and the maximum number of simultaneously connectable users equal to 500. In FIG. 5, values on vertical and horizontal axes are normalized by the processing gain.

Figure 6:
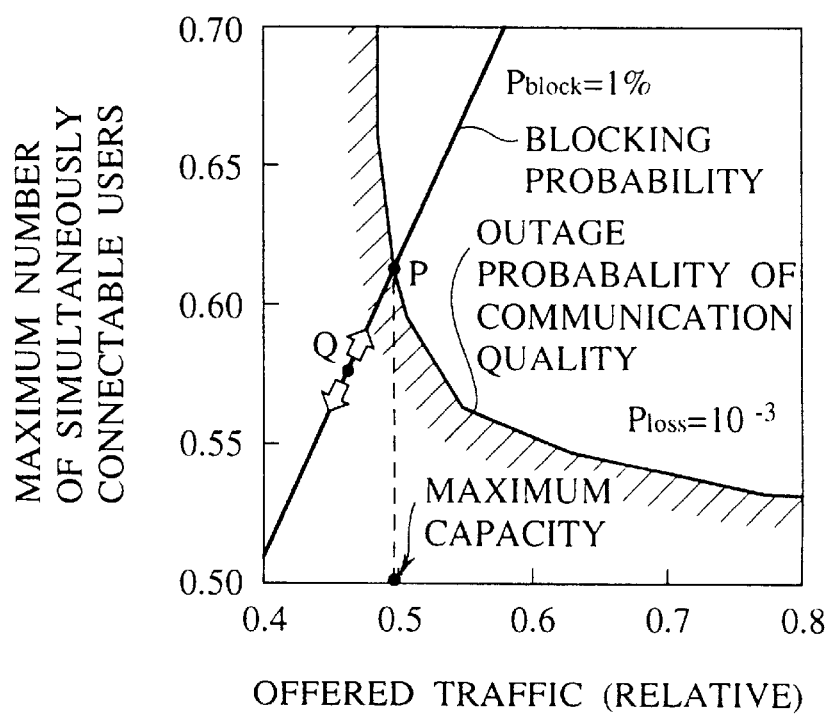
FIG. 6 is a graph used in setting up a maximum number of simultaneously connectable users in the first embodiment of the present invention.

Then, the maximum number of simultaneously connectable users N is set up as illustrated in a graph of FIG. 6. In FIG. 6, values on vertical and horizontal axes are normalized by the processing gain. This graph of FIG. 6 is for an exemplary case of the speech probability $\rho=0.4$, with the designed settings of the blocking probability $P_{block}=1\%$ and the outage probability of communication quality $P_{loss}=10^{-3}$.

A curve for the outage probability of communication quality indicates the relationship between the offered traffic and the maximum number of simultaneously connectable users for satisfying a required outage probability of communication quality, which can be obtained by using the above expression (6) repeatedly while sequentially changing values of N and $P_k$. For the probability density distribution of the other cell interference, the Gamma distribution is used as described above.

A straight line for the blocking probability indicates the relationship between the offered traffic and the maximum number of simultaneously connectable users which is obtained by using the well known Erlang's B formula expressing the blocking probability B for the offered traffic a at an exchanger with a number of channels N and given by the following expression (7).

$$B = \frac{a^N/N!}{\sum_{j=0}^{N} a^j/j!} \quad (7)$$

In FIG. 6, the communication quality of $P_{loss} \leq 10^{-3}$ is guaranteed at a region below the curve for the outage probability of communication quality (a shared region in FIG. 6). Therefore, the maximum capacity of this system can be determined as a point on the horizontal axis below an intersection P of the curve for the outage probability of communication quality and the straight line for the blocking probability, as indicated in FIG. 6. Then, by determining the maximum number of simultaneously connectable users according to the Erlang's B formula for the offered traffic less than or equal to this maximum capacity, it is possible to determine the maximum number of simultaneously connectable users for the call admission control which satisfies a given blocking probability while guaranteeing the communication quality.

For example, when the estimated offered traffic at a base station to be designed is at an intersection of a vertical line passing through a point Q and the horizontal axis, the maximum number of simultaneously connectable users can be set equal to a number indicated by an intersection between a horizontal line passing through the point Q and the vertical axis. This holds true for any point Q which is located to the left side of the point P in FIG. 6. Arrows depicted on both sides of the point Q are intended to indicate this fact.

According to the call admission control scheme of this first embodiment, it is possible to determine the maximum number of simultaneously connectable users for satisfying a given blocking probability while guaranteeing the outage probability of communication quality below a prescribed value, and it is possible to realize the call admission control which can guarantee the communication quality and the connection quality (blocking probability) by means of a simple control at each base station.

It is to be noted that, in the above description, an exemplary case of using regularly arranged hexagonal cells with the offered traffics which are uniform and constant in time is used for the sake of explanation, but this first embodiment is equally applicable to cases under different conditions by obtaining the probability density distribution of the other cell interference by means of an actual measurement, a theoretical calculation, or a computer simulation, and the similar effects as described above can also be realized in these other cases.

It is also to be noted that, in the above description, it is assumed that each base station uses a frequency bandwidth shared by a plurality of user for each of an upward link and a downward link, and that all the base stations use the identical frequency bandwidth, for the sake of explanation. However, the mobile communication system according to this first embodiment is not to be limited by these assumptions. Namely, it is possible to realize the similar effects in a case of using a plurality of frequency bandwidths at each base station, by applying the call admission control scheme of this first embodiment repeatedly to each frequency bandwidth involved.

In addition, this first embodiment is applicable to a case in which the frequency bandwidths used by the base stations are not necessary identical, by obtaining the probability density distribution of the other cell interference by means of an actual measurement, a theoretical calculation, or a computer simulation, and the similar effects as described above can also be realized in such a case.

It is also possible to use the relationship among the outage probability of communication quality, the maximum number of simultaneously connectable users, and the offered traffic obtained by means of an actual measurement or a computer simulation, instead of the theoretical calculation based on the expressions (1) to (7) as described above.

Next, referring to FIG. 7 to FIG. 10, the second embodiment of a method and an apparatus for a call admission control in the CDMA mobile communication system according to the present invention will be described in detail.

The first embodiment described above is directed to the call admission control scheme which determines in advance the maximum number of simultaneously connectable users for satisfying a required blocking probability characteristic, while guaranteeing the communication quality, by paying attention to a number of users who are carrying out communications through each base station 11. In contrast, this second embodiment is directed to the call admission control scheme which is capable of dealing more flexibly with the variation in the interference level due to the traffic variation or the propagation state change.

In this second embodiment, the CDMA mobile communication system has a schematic configuration similar to that shown in FIG. 1 described above.

Figure 7:
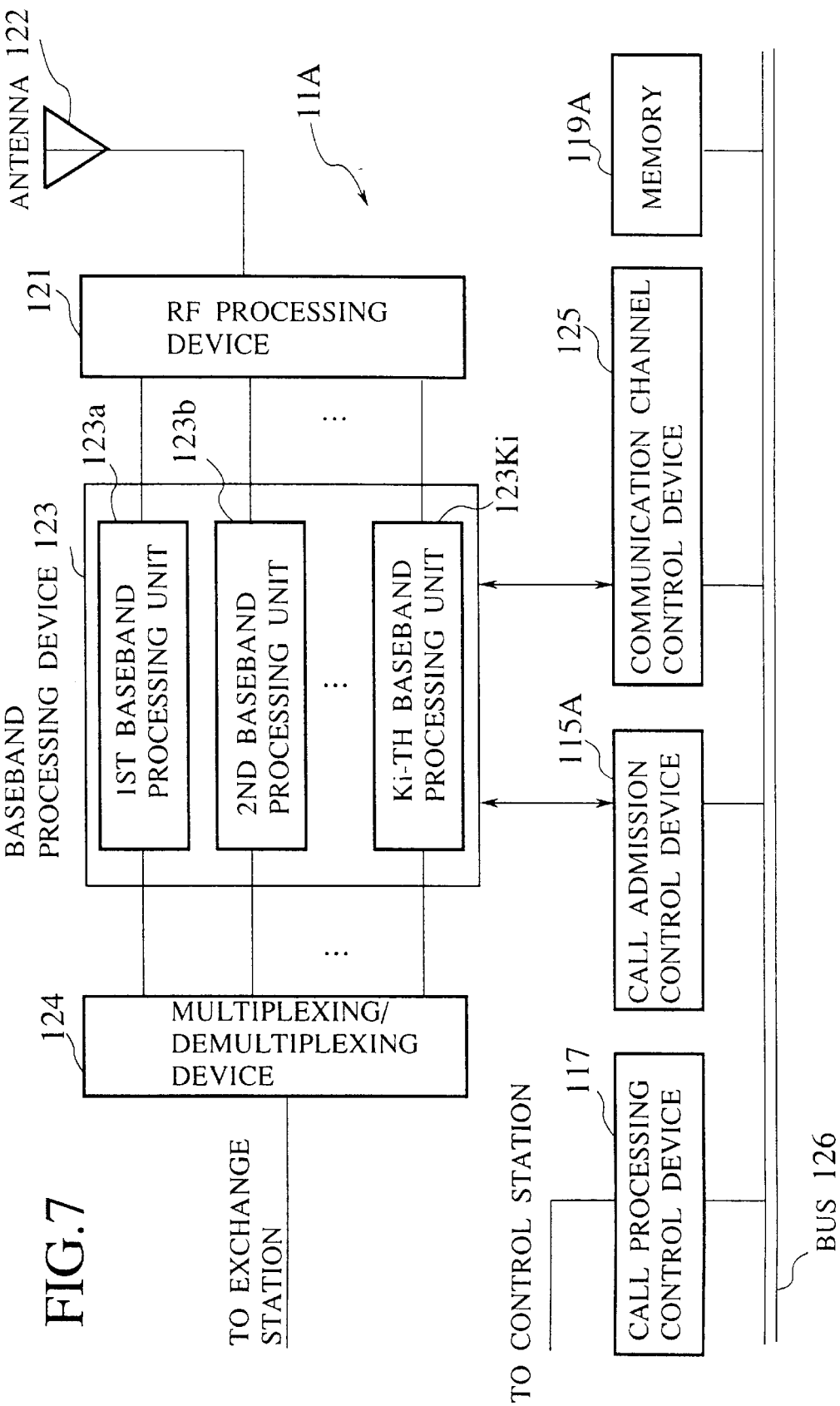
FIG. 7 is a partial functional block diagram of a base station related to a call admission control in the second embodiment of the present invention.

Each base station 11A in this second embodiment has a partial functional configuration related to the call admission control as shown in FIG. 7. Each base station 11A also has a usual configuration for the other usual functions of the base station in the CDMA mobile communication system, which should be well known to those skilled in the art so that its description will be omitted here.

In the functional configuration of FIG. 7, each base station 11A has a section for transmitting and receiving user data via radio, including an RF processing device 121 connected with an antenna 122, a baseband processing device 123 containing Ki sets of baseband processing units 123a to 123Ki and connected with the RF processing device 121, and a multiplexing/demultiplexing device 124 connected with the baseband processing device 123. The multiplexing/demultiplexing device 124 is also connected with an exchange station so as to function as an interface for multiplexing/demultiplexing the user data of a plurality of users.

Each base station 11A also has a section for controlling the baseband processing device 123 and realizing the call admission control, including a call admission control device 115A, a call processing control device 117, a communication channel control device 125, and a memory 119A, which are connected with each other through a bus 126. The call processing control device 117 is connected with a control station for controlling the base stations, while the call admission control device 115A and the communication channel control device 125 are connected with the baseband processing device 123.

The call admission control device 115A reads, updates, and writes data stored in the memory 119A according to a request from the call processing control device 117, and manages spread codes used by the mobile stations 13 which are currently carrying out communications through this base station 11A. The communication channel control device 125 manages Ki sets of baseband processing units 123. The memory 119A stores data including a utilization state of the spread codes, a measured interference level $I_{observe}$, and an interference threshold $I_{thr}$ to be used in the call admission control.

Figure 8:
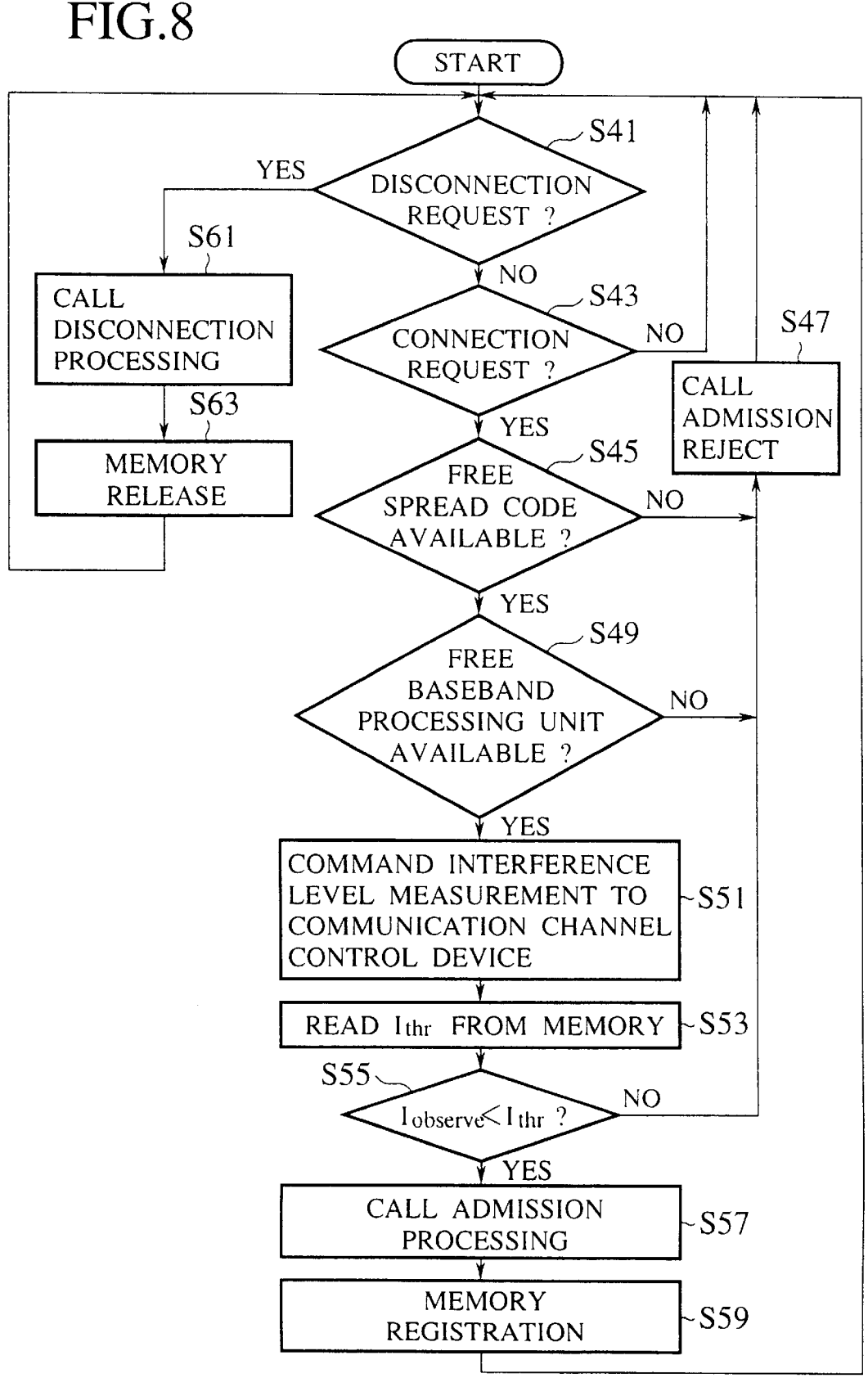
FIG. 8 is a flow chart for a call admission control operation by a call admission control device in the base station of FIG. 7.

In this base station 11A of FIG. 7, the call admission control operation procedure according to the flow chart of FIG. 8 is carried out as follows.

First, when there is a disconnection request from the call processing control device 117 at the step S41, the call admission control device 115A carries out the call disconnection processing by releasing a corresponding baseband processing unit 123 through the communication channel control device 125 at the step S61, and releases the memory 119A by deleting data on a corresponding mobile station 13 on the memory 119A at the step S63. The operation then returns to the beginning.

On the other hand, when there is a connection request for a new call from the call processing control device 117 at the step S43, the call admission control device 115A checks whether a free spread code (a spread code which is currently not in use) is available or not at the step S45. When all the spread codes are currently in use at the step S45, the call admission control device 115A rejects the call admission and notifies this fact to the call processing control device 117 at the step S47, and then the operation returns to the beginning.

When there is an available free spread code at the step S45, the call admission control device 115A inquires the communication channel control device 125 as to whether a free baseband processing unit (a baseband processing unit 123 which is currently not in use) is available or not at the step S49. When all the baseband processing units 123 are currently in use at the step S49, the communication channel control device 125 notifies this fact to the call processing control device 117 through the call admission control device 115A while the call admission is rejected at the step S47, and the operation returns to the beginning.

When there is an available free baseband processing unit 123 at the step S49, the call admission control device 115A commands the measurement of the interference level to the communication channel control device 125 at the step S51. In response, the communication channel control device 125 selects the available baseband processing unit 123, allocates the available spread code, measures the interference level, and notifies the measured interference level $I_{observe}$ to the call admission control device 115A.

Then, the call admission control device 115A reads out the interference threshold $I_{thr}$ for the call admission control from the memory 119A at the step S53, and compares this interference threshold $I_{thr}$ with the measured interference level $I_{observe}$ received from the communication channel control device 125 at the step S55. When $I_{observe}$ is not less than $I_{thr}$, i.e., $I_{observe} \geq I_{thr}$ at the step S55, the call admission control device 115A rejects the call admission and notifies this fact to the call processing control device 117 at the step S47, and then the operation returns to the beginning.

When $I_{observe}$ is less than $I_{thr}$ at the step S55, the call admission control device 115A carries out the call admission processing by allocating the spread code and the baseband processing unit 123 at the step S57, and registers this allocation in the memory 119A at the step S59. The operation then returns to the beginning.

When there is no disconnection request or connection request from the call processing control device 117 at the steps S41 and S43, the operation also returns to the beginning.

It is to be noted here that, in the above, the communication channel control device 125 makes the interference level measurement when a call connection request is generated, but it is also possible to adopt a configuration in which the call admission control device 115A regularly commands the interference level measurement to the communication channel control device 125, and records the measured results as $I_{observe}$ on the memory 119A. In this case, the call admission control device 115A reads out $I_{observe}$ and $I_{thr}$ from the memory 119A, and compares them each other, when a call connection request is generated.

Now, a manner of setting up the interference threshold $I_{thr}$ in this second embodiment will be described. Here, for the sake of explanation, a use of the transmission power control based on the reception level is assumed. In addition, taking the voice activation into consideration, it is assumed that each user takes a speech state at a probability (time rate) of $\rho$ and a silent state at a probability of $(1-\rho)$, mutually exclusively.

Figure 9:
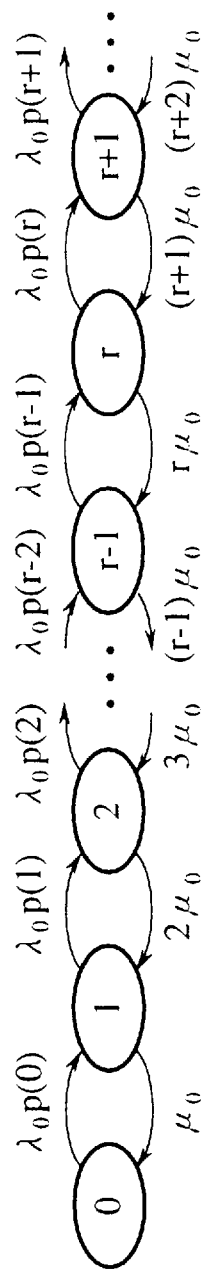
FIG. 9 is a state transition diagram for a random call used in the second embodiment of the present invention.

When a call is assumed to be a random call with an arrival rate $\lambda_0$ (call arrivals per unit time) and a service rate $\mu_0$ (such that $1/\mu_0$ gives an average service time), the state transition from one state to another can be made as shown in the state transition diagram of FIG. 9. Here, p(j) represents a probability for an occurred call to be admitted without a blocking when a number of simultaneously connected users is J. Therefore, a probability $P_r$ for the number of simultaneously connected users to be r within this base station can be given by the following expression (8).

$$P_r = \frac{a^r}{r!} P_0 \prod_{j=0}^{r-1} p(j) \quad (r \geq 1) \tag{8}$$

where $a = \lambda_0/\mu_0$. Here, a total sum of the probability Pr for all values of r must be equal to 1, so that the following expressions (9) and (10) hold.

$$P_0 + P_0 \sum_{r=1}^{\infty} \frac{a^r}{r!} \prod_{j=0}^{r-1} p(j) = 1 \tag{9}$$

$$P_0 = \left(1 + \sum_{r=1}^{\infty} \frac{a^r}{r!} \prod_{j=0}^{r-1} p(j)\right)^{-1} \tag{10}$$

consequently, it follows that the probability $P_r$ can be given by the following expression (11).

$$P_r = \frac{\frac{a^r}{r!} \prod_{j=0}^{r-1} p(j)}{1 + \sum_{k=1}^{\infty} \frac{a^k}{k!} \prod_{j=0}^{k-1} p(j)} \quad (r \geq 1) \tag{11}$$

Next, the probability p(j) can be obtained as follows. This probability p(J) is a probability for an occurred call to be admitted without a blocking when a number of simultaneously connected users is j as already mentioned above, so that a probability for an occurred call to be blocked can be given by 1p(j). Note that a new call is blocked when a sum of the interference level from an area covered by this base station and the interference level from areas covered by the other base stations is greater than or equal to the interference threshold $I_{thr}$ at a time this new call occurred.

Now, let $T_{block}$ be a converted number of users equivalent to the interference level which is obtained by dividing the interference threshold $I_{thr}$ by a reception level per one user, then the probability p(j) can be given by the following expression (12).

$$1 - p(j) = \sum_{k=0}^{j} \binom{j}{k} \rho^k (1-\rho)^{j-k} \int_{T_{block}-k}^{\infty} p_{int}(m) dm \tag{12}$$

where $p_{int}(m)$ is the probability density distribution of the interference level from areas covered by the other base stations, and m is a converted number of users within this base station equivalent to the interference level from areas covered by the other base stations.

Consequently, the blocking probability $P_{block}$ can be given by the following expression (13).

$$P_{block} = \sum_{r=0}^{\infty} (1 - p(r)) P_r \qquad (13)$$

Here, assuming that the average blocking probability is uniform over all the base stations, $P_r$ and $p(r)$ appearing in the above expression (13) are both functions of $P_{block}$, so that the above expression (13) is in a form of $x=f(x)$. Thus by producing a function for calculating a value of the right hand side for a given $P_{block}$, and repeatedly using this function until the $P_{block}$ resulting from this function becomes equal to the given $P_{block}$, it is possible to calculate the blocking probability $P_{block}$.

Next, the outage probability of communication quality can be obtained as follows. A probability $P_k$ for k users to be in the speech state within this base station is given by the following expression (14).

$$P_k = \sum_{r=k}^{N} \binom{r}{k} \rho^k (1-\rho)^{r-k} P_r \qquad (14)$$

The communication quality is degraded when a total sum of the interference from the other users in the speech state within the own cell and the interface from the other cells exceeds a certain limit value $C_{max}$. This limit value $C_{max}$ is given by the following expression (15).

$$c_{max} = \frac{pg(1 - \eta^{-1})}{E_b/I_{0,req}} \qquad (15)$$

where pg is a processing gain, $E_b/I_{0,req}$ is a ratio of an energy per one bit of desired signals with respect to an interference, which is determined from the transmission characteristics, and n is a parameter corresponding to a transmission power of a mobile station, for which $\eta = I_{0,req}/N_0$ holds for the thermal noise $N_0$.

When a probability density distribution of the other cell interference is set to be $p_{int}$ (m), the outage probability of communication quality $P_{loss}$ is given by the following expression (16).

$$p_{loss} = \frac{\sum_{k=0}^{\infty} kP_k \int_{C_{max} + 1 - k}^{\infty} p_{int}(m) dm}{\sum_{k=0}^{\infty} kP_k} \qquad (16)$$

The probability density distribution of the other cell interference $p_{int}$ (m) can be determined by an actual measurement, a theoretical calculation, or a computer simulation.

Here, an exemplary case of using a computer simulation will be described. In this exemplary case, a simulation area was the same as that used in the first embodiment which was formed by nineteen hexagonal cells and data were sampled at a central cell A as indicated in FIG. 4 described above. The offered traffics at the cells were assumed to be uniform and constant in time, and the settings of a distance attenuation constant $\alpha=4$ and a standard deviation of short term median value variation $\sigma=8$ dB were used. As a result, it was confirmed the distribution of the other cell interference can be well approximated by the Gamma distribution with a mean $0.6a (1-P_{block}) \rho$ and a variance $0.23a (1-P_{block})\rho$. Note that the Gamma distribution can be expressed by the following expression (17).

$$px = \qquad 17$$

As already described above, FIG. 5 shows an example of the probability density distribution of the other cell interference $p_{int}$ (m), which is a case obtained by using the offered traffic equal to 70 erl/cell and the maximum number of simultaneously connectable users equal to 500. In FIG. 5, values on vertical and horizontal axes are normalized by the processing gain.

Figure 10:
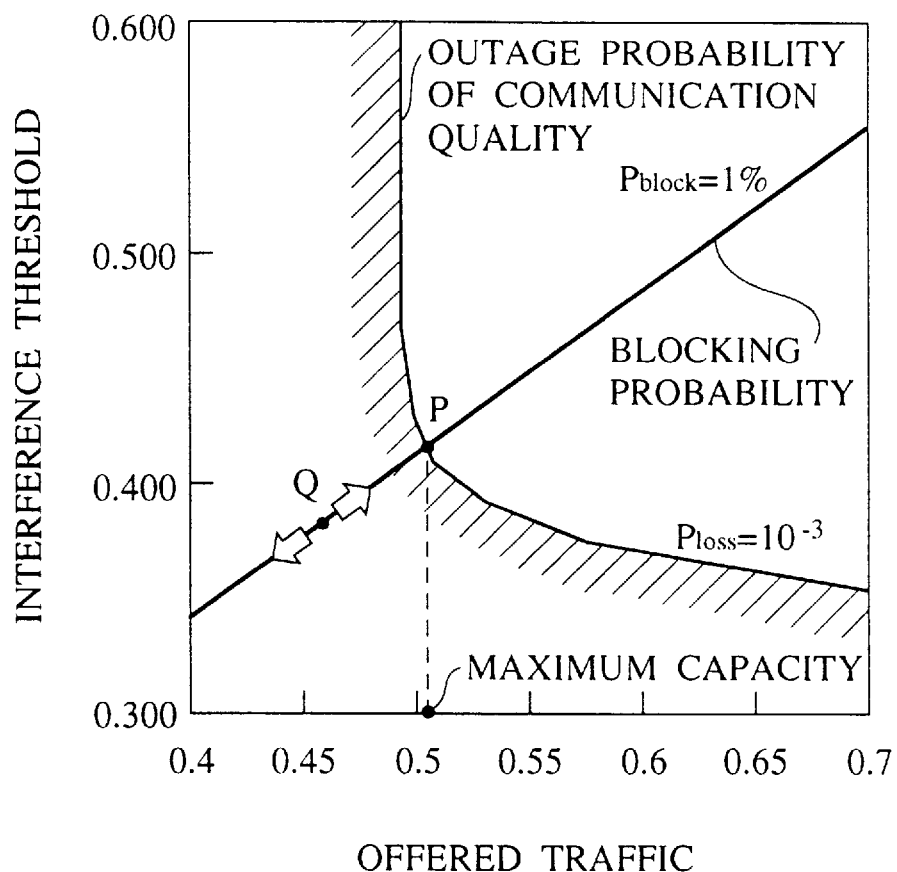
FIG. 10 is a graph used in setting up an interference threshold in the second embodiment of the present invention.

Then, the interference threshold $I_{thr}$ is set up as illustrated in a graph of FIG. 10. In FIG. 10, values on vertical and horizontal axes are normalized by the processing gain. This graph of FIG. 10 is for an exemplary case of the speech probability $\rho=0.4$, with the designed settings of the blocking probability $P_{block}=1\%$ and the outage probability of communication quality $P_{loss}=10^{-3}$.

A curve for the outage probability of communication quality indicates the relationship between the offered traffic and the interference threshold for satisfying a required outage probability of communication quality, which can be obtained by using the above expression (16) repeatedly while sequentially changing values of N and $P_k$. For the probability density distribution of the other cell interference, the Gamma distribution is used as described above.

A straight line for the blocking probability indicates the relationship between the offered traffic and the interference threshold which is obtained by using the above expression (13).

In FIG. 10, the communication quality of $P_{loss} \leq 10^{-3}$ is guaranteed at a region below the curve for the outage probability of communication quality (a shared region in FIG. 10). Therefore, the maximum capacity of this system can be determined as a point on the horizontal axis below an intersection P of the curve for the outage probability of communication quality and the straight line for the blocking probability, as indicated in FIG. 10. Then, by determining the interference threshold according to the above expression (13) for the offered traffic less than or equal to this maximum capacity, it is possible to determine the interference threshold for the call admission control which satisfies a given blocking probability while guaranteeing the communication quality.

For example, when the estimated offered traffic at a base station to be designed is at an intersection of a vertical line passing through a point Q and the horizontal axis, the interference threshold can be set equal to a number indicated by an intersection between a horizontal line passing through the point Q and the vertical axis. This holds true for any point Q which is located to the left side of the point P in FIG. 10. Arrows depicted on both sides of the point Q are intended to indicate this fact.

According to the call admission control scheme of this second embodiment, it is possible to determine the interference threshold for satisfying a given blocking probability while guaranteeing the outage probability of communication quality below a prescribed value, and it is possible to realize the call admission control which can guarantee the communication quality and the connection quality (blocking probability) by means of a simple control at each base station.

In addition, it is also possible for this second embodiment to deal more flexibly with the traffic variation and the propagation state change compared with the first embodiment. Note that the first embodiment controls whether or not to admit a call according to how many users are currently connected within the own cell, so that the first embodiment cannot account for the traffic variation or the propagation state change at sorrounding cells. In contrast, this second embodiment, the measured interference level is a sum of the intereference within the own cell and the interference from the other cells, so that this second embodiment can account for the traffic variation and the propagation state change at sorrounding cells, and it is possible to realize the call admission control which can guarantee the communication quality and the connection quality while taking an advantage of such a flexibility due to the control according to the interference threshold.

It is to be noted that, in the above description, an exemplary case of using regularly arranged hexagonal cells with the offered traffics which are uniform and constant in time is used for the sake of explanation, but this second embodiment is equally applicable to cases under different conditions by obtaining the probability density distribution of the other cell interference by means of an actual measurement, a theoretical calculation, or a computer simulation, and the similar effects as described above can also be realized in these other cases.

It is also to be noted that, in the above description, it is assumed that each base station uses a frequency bandwidth shared by a plurality of user for each of an upward link and a downward link, and that all the base stations use the identical frequency bandwidth, for the sake of explanation. However, the mobile communication system according to this second embodiment is not to be limited by these assumptions. Namely, it is possible to realize the similar effects in a case of using a plurality of frequency bandwidths at each base station, by applying the call admission control scheme of this second embodiment repeatedly to each frequency bandwidth involved.

In addition, this second embodiment is applicable to a case in which the frequency bandwidths used by the base stations are not necessary identical, by obtaining the probability density distribution of the other cell interference by means of an actual measurement, a theoretical calculation, or a computer simulation, and the similar effects as described above can also be realized in such a case.

It is also possible to use the relationship among the outage probability of communication quality. the interference threshold, and the offered traffic obtained by means of an actual measurement or a computer simulation, instead of the theoretical calculation based on the expressions (8) to (17) as described above.

Referring now to FIG. 11 to FIG. 19, the third embodiment of a method and an apparatus for a call admission control in the CDMA mobile communication system according to the present invention will be described in detail.

The first and second embodiments described above are directed to the call admission control schemes which can satisfy a given blocking probability while guaranteeing a prescribed outage probability of communication quality. However, these call admission control schemes are associated with a drawback in that, at a time of using these call admission control schemes in the actual designing of a mobile communication system, there is a need to obtain a radio propagation state and a traffic distribution in detail by an actual measurement or a theoretical calculation, so that a considerable amount of works may be required for the designing.

In addition, in the actual mobile communication system, the radio propagation state and the traffic distribution can be changed significantly when there is a construction or destruction of nearby buildings or roads, and there may be cases in which it is necessary to additionally provide new base stations in order to deal with such a change, but in such a case, the re-designing of the mobile communication system becomes necessary. Thus the call admission control schemes of the first and second embodiments described above are also associated with another drawback in that there is only a limited adaptability with respect to the system expansion.

In view of these situations, this third embodiment is directed to a method and an apparatus for a call admission control in the CDMA mobile communication system, which can satisfy a given blocking probability while guaranteeing a predetermined communication quality, by means of distributed autonomous control at each base station.

In this third embodiment, the CDMA mobile communication system has a schematic configuration similar to that shown in FIG. 1 described above.

Figure 11:
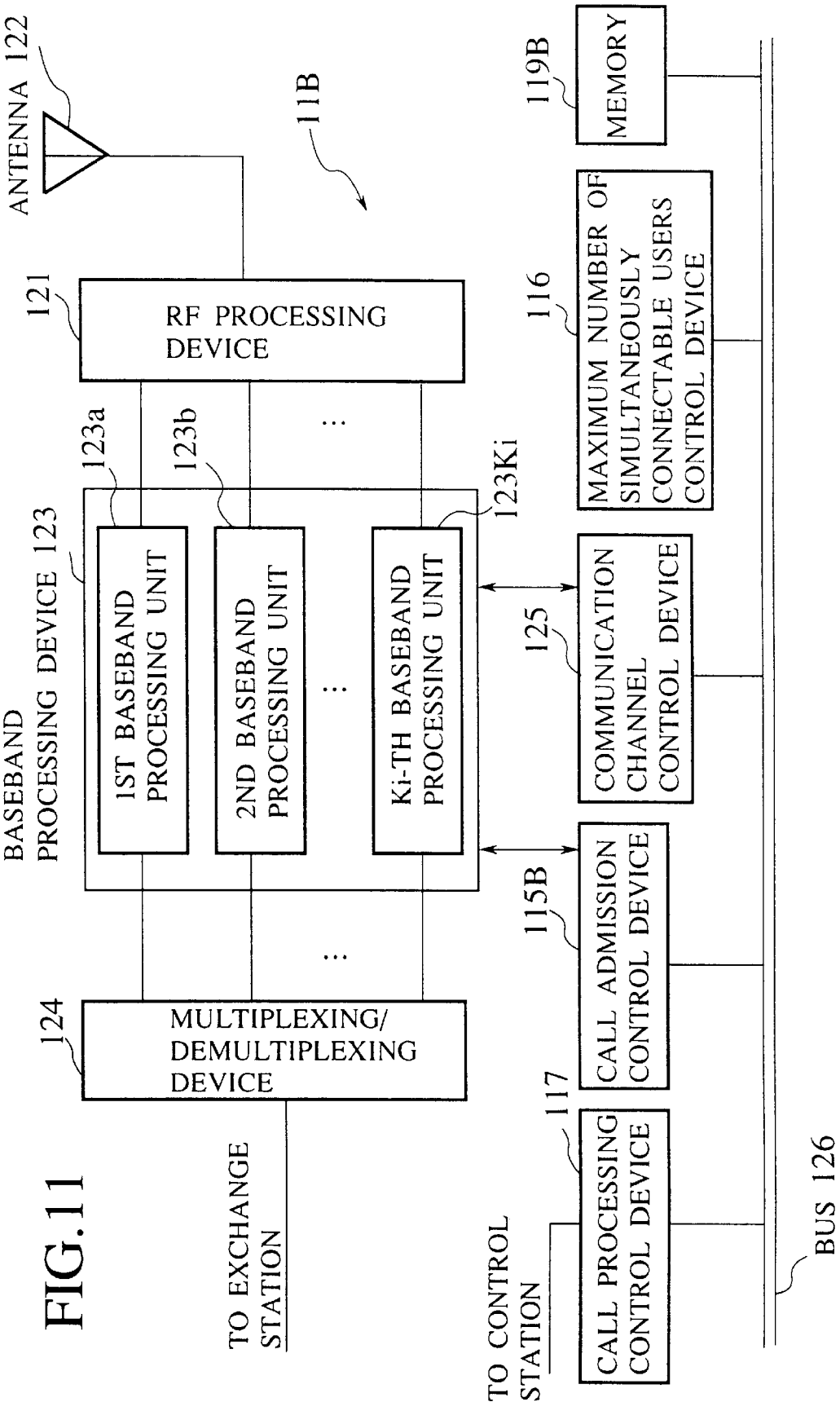
FIG. 11 is a partial functional block diagram of a base station related to a call admission control in the third embodiment of the present invention.

Each base station 11B in this third embodiment has a partial functional configuration related to the call admission control as shown in FIG. 11. Each base station 11B also has a usual configuration for the other usual functions of the base station in the CDMA mobile communication system, which should be well known to those skilled in the art so that its description will be omitted here.

In the functional configuration of FIG. 11, each base station 11B has a section for transmitting and receiving user data via radio, including an RF processing device 121 connected with an antenna 122, a baseband processing device 123 containing Ki sets of baseband processing units 123a to 123Ki and connected with the RF processing unit device, and a multiplexing/demultiplexing device 124 connected with the baseband processing device 123. The multiplexing/demultiplexing device 124 is also connected with an exchange station so as to function as an interface for multiplexing/demultiplexing the user data of a plurality of users.

Each base station 11 also has a section for controlling the baseband processing device 123 and realizing the call admission control, including a call admission control device 115B, a call processing control device 117, a communication channel control device 125, a memory 119B, and a maximum number of simultaneously connectable users control device 116, which are connected with each other through a bus 126. The call processing control device 117 is connected with a control station for controlling the base stations, while the call admission control device 115B and the communication channel control device 125 are connected with the baseband processing device 123.

Ki sets of baseband processing units 123 are provided in correspondence to Ki sets of spread codes, where each baseband processing unit 123 corresponds to a transceiver in the FDMA or TDMA system and includes an encoder for spreading input signals by the spread code and a correlator for obtaining signals corresponding to its own spread code from the demodulated signals.

The communication channel control device 125 manages Ki sets of baseband processing units 123.

The call admission control device 115B reads, updates, and writes data stored in the memory 119B according to a request from the call processing control device 117, and manages spread codes used by the mobile stations 13 which are currently carrying out communications through this base station 11B.

The maximum number of simultaneously connectable users control device 116 acquires an information related to the blocking probability according to a call sending or receiving success/failure notice from the call admission control device 115B and an information related to the outage probability of communication quality according to a communication quality measurement result report from the communication channel control device 125, while determining the maximum number of simultaneously connectable users N and registering the determined maximum number of simultaneously connectable users N into the memory 119B.

The memory 119B stores data including a utilization state of the spread codes, a number of currently connected users C, a maximum number of simultaneously connectable users N to be used in the call admission control, a blocking probability information, an outage probability of communication quality information, etc.

Figure 12:
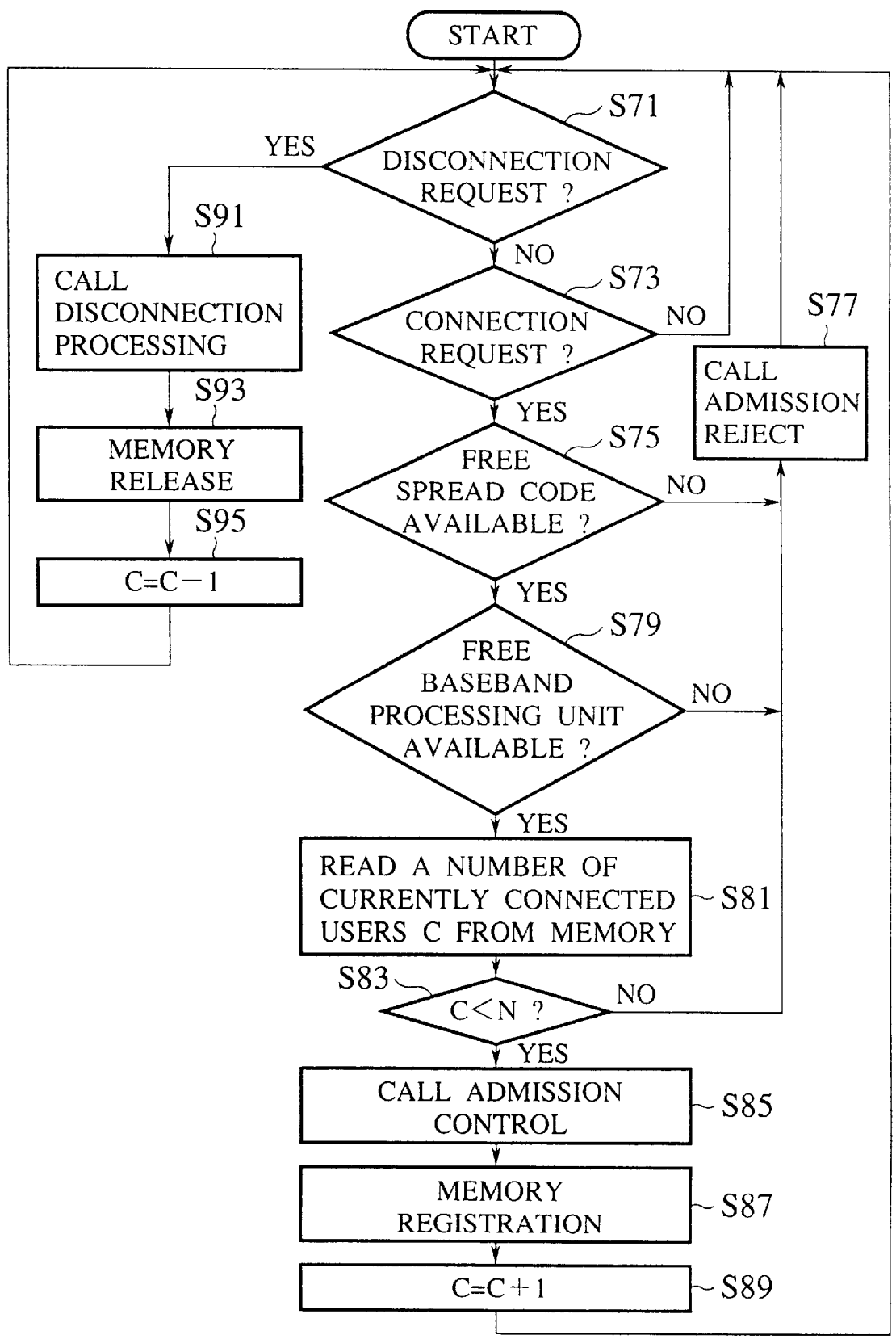
FIG. 12 is a flow chart for a call admission control operation by a call admission control device in the base station of FIG. 11.

In this base station 11B of FIG. 11, the call admission control operation procedure according to the flow chart of FIG. 12 is carried out as follows.

First, when there is a disconnection request from the call processing control device 117 at the step S71, the call admission control device 115B carries out the call disconnection processing by releasing a corresponding baseband processing unit 123 through the communication channel control device 125 at the step S91, and releases the memory 119B by deleting data on a corresponding mobile station 13 on the memory 119B at the step S93. The call admission control device 115B then reduces the number of currently connected users C by one at the step S95, and the operation returns to the beginning.

On the other hand, when there is a connection request for a new call from the call processing control device 117 at the step S73, the call admission control device 115B checks whether a free spread code (a spread code which is currently not in use) is available or not at the step S75. When all the spread codes are currently in use at the step S75, the call admission control device 115B rejects the call admission and notifies this fact to the call processing control device 117 at the step S77, and then the operation returns to the beginning.

When there is an available free spread code at the step S75, the call admission control device 115B inquires the communication channel control device 125 as to whether a free baseband processing unit (a baseband processing unit 123 which is currently not in use) is available or not at the step S79. When all the baseband processing units 123 are currently in use at the step S79, the communication channel control device 125 notifies this fact to the call processing control device 117 through the call admission control device 115B while the call admission is rejected at the step S77, and the operation returns to the beginning.

When there is an available free baseband processing unit 123 at the step S79, the call admission control device 115B reads out the number of currently connected users C in this base station 11B from the memory 119B at the step S81, and compares this number of currently connected users C with the maximum number of simultaneously connectable users N stored on the memory 119B at the step S83. When N is not greater than C, i.e., when N is less than or equal to C at the step S83, the call admission control device 115B rejects the connection of a new call and notifies this fact to the call processing control device 117 and the maximum number of simultaneously connectable users control device 116 at the step S77, and then the operation returns to the beginning.

When N is greater than C at the step S83, the call admission control device 115B carries out the call admission processing by allocating the spread code and the baseband processing unit 123 at the step S85, and registers this allocation in the memory 119B at the step S87. The call admission control device 115B then increases the number of currently connected users C by one at the step S89 while notifying the admission of a new call to the maximum number of simultaneously connectable users control device 116, and the operation returns to the beginning.

When there is no disconnection request or connection request from the call processing control device 117 at the steps S71 and S73, the operation also returns to the beginning.

Now, the operation of the maximum number of simultaneously connectable users control device 116 in this third embodiment will be described.

Figure 13:
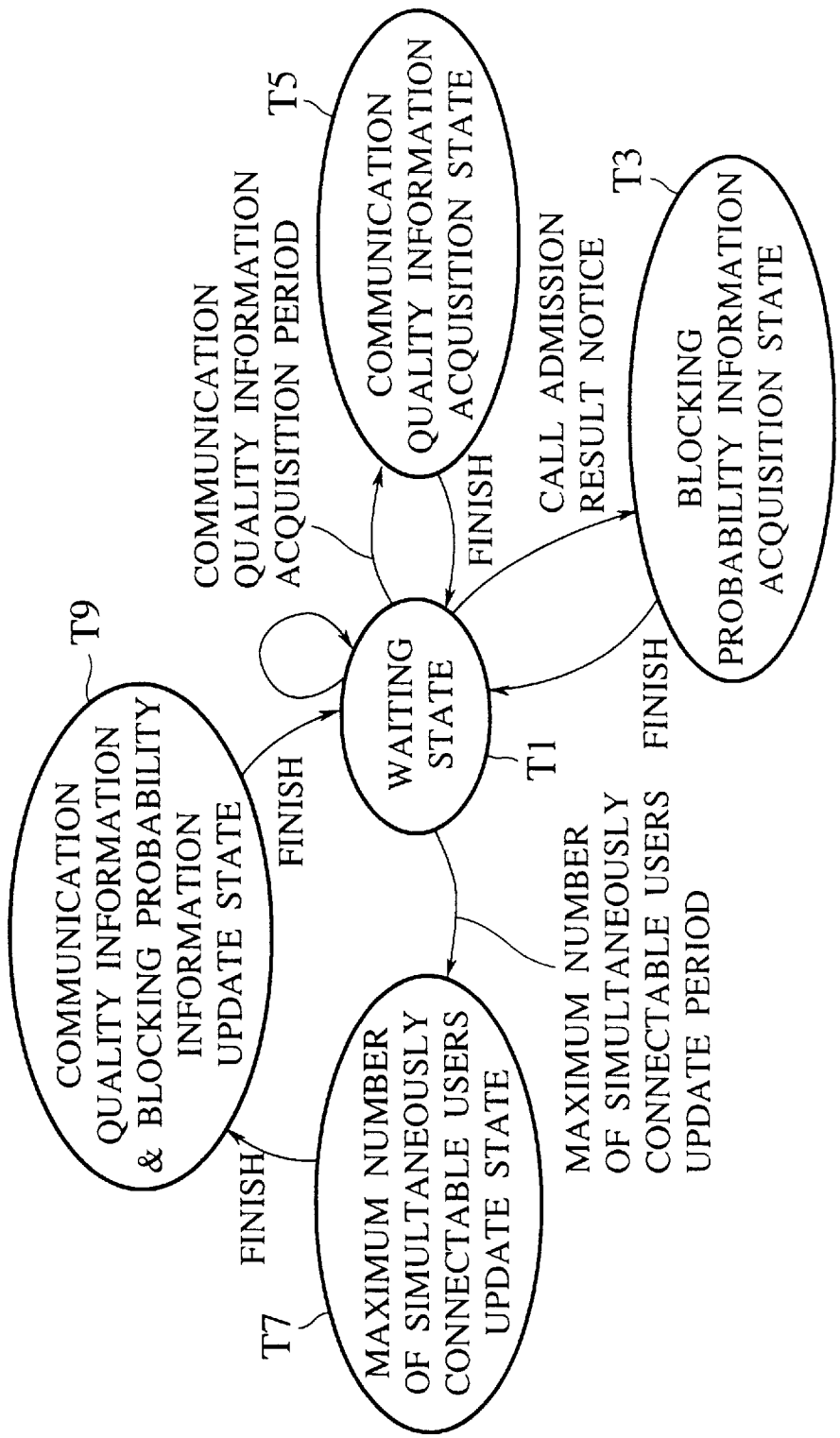
FIG. 13 is a state transition diagram for a maximum number of simultaneously connectable users control device in the base station of FIG. 11.

FIG. 13 shows a state transition diagram for the maximum number of simultaneously connectable users control device 116.

In a case of calculating the blocking probability by measuring a number of originated calls, a number of terminated calls, and a number of incomplete originated or terminated calls within the own radio zone, when a call admission result notice is received from the call admission control device 115B while being in a waiting state T1, the maximum number of simultaneously connectable users control device 116 makes transition to a blocking probability information acquisition state T3 to execute a blocking probability information acquisition process, and returns to the waiting state T1 when this process is finished.

In a case of calculating the blocking probability by measuring the carried traffic within the own radio zone, while being in the waiting state T1, the maximum number of simultaneously connectable users control device 116 makes transition to the blocking probability information acquisition state T3 at each blocking probability information acquisition period to execute the blocking probability information acquisition process, and returns to the waiting state T1 when this process is finished.

Note here that FIG. 13 only shows a state transition for the former case of calculating the blocking probability by measuring a number of originated calls, a number of terminated calls, and a number of incomplete originated or terminated calls within the own radio zone.

Also, while being in the waiting state T1, the maximum number of simultaneously connectable users control device 116 makes transition to the communication quality information acquisition state T5 at each communication quality information acquisition period to execute a communication quality information acquisition process, and returns to the waiting state T1 when this process is finished.

Also, while being in the waiting state T1, the maximum number of simultaneously connectable users control device 116 makes transition to the maximum number of simultaneously connectable users update state T7 at each maximum number of simultaneously connectable users update period to execute a maximum number of simultaneously connectable users update process, and when this process is finished, the maximum number of simultaneously connectable users control device 116 makes transition to the communication quality information and blocking probability information update state T9 to execute a communication quality information and blocking probability information update process, and then returns to the waiting state T1 when this process is finished.

Figure 14:
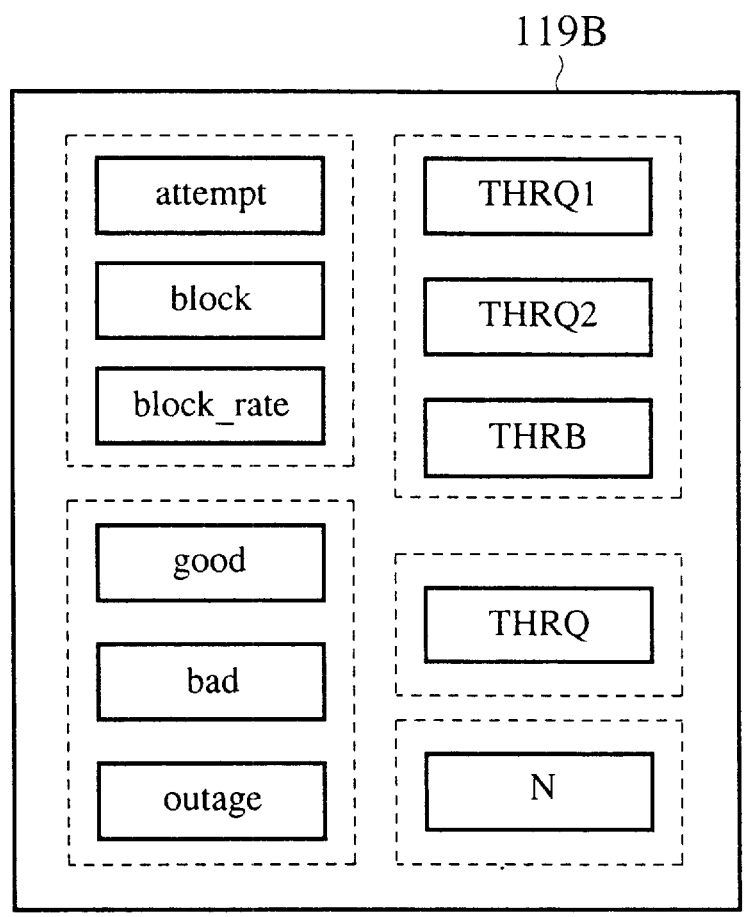
FIG. 14 is a diagrammatic illustration of data stored by a memory in the base station of FIG. 11, which are used by a maximum number of simultaneously connectable users control device in the base station of FIG. 11.

FIG. 14 conceptually shows data stored in the memory 119B which are used by the maximum number of simultaneously connectable users control device 116, among variables and constants stored in the memory 119B.

Among data shown in FIG. 14, "attempt", "block" and "block_rate" are variables to be updated according to the call admission result notice from the call admission control device 115B, which respectively represent a number of originated or terminated calls, a number of blocked calls, and a blocking probability. Also, "good", "bad", and "outage" are variables to be updated according to the communication quality measurement result, which respectively represent a number of times for judging that the communication quality is not degraded, a number of times for judging that the communication quality is degraded, and an outage probability of communication quality.

Also, "THRQ" is a constant representing a threshold used in obtaining the outage probability of communication quality, such that the communication quality is judged degraded when the communication quality measurement result is less than a value of this "THRQ". Also, "THRQ1", "THRQ2", and "THRB" are constants representing thresholds used in updating the maximum number of simultaneously connectable users in the maximum number of simultaneously connectable users update process, which respectively represent a first threshold for the outage probability of communication quality, a second threshold for the outage probability of communication quality, and a threshold for the blocking probability, where "THRQ1">"THRQ2". Also, "N" is a variable used in the call admission control, which represents the maximum number of simultaneously connectable users.

In general, "THRQ" and "THRB" are set to values close to the tolerable upper limits of the outage probability of communication quality and the blocking probability, "THRQ1" is set to a value close to "THRQ", while "THRQ2" is set to a value sufficiently smaller than "THRQ1", although the actual settings of these constants depend on the required properties of the control to be realized.

Using these data stored in the memory 119B, the maximum number of simultaneously connectable users control device 116 carries out various processes as mentioned above according to the flow charts of FIG. 15 to FIG. 19. In FIG. 15 to FIG. 19, a symbol "=" indicates a substitution of a right hand side into a left hand side while a symbol "++" indicates an increase of a variable by one and a symbol "−−" indicates a decrease of a variable by one.

Figure 15:
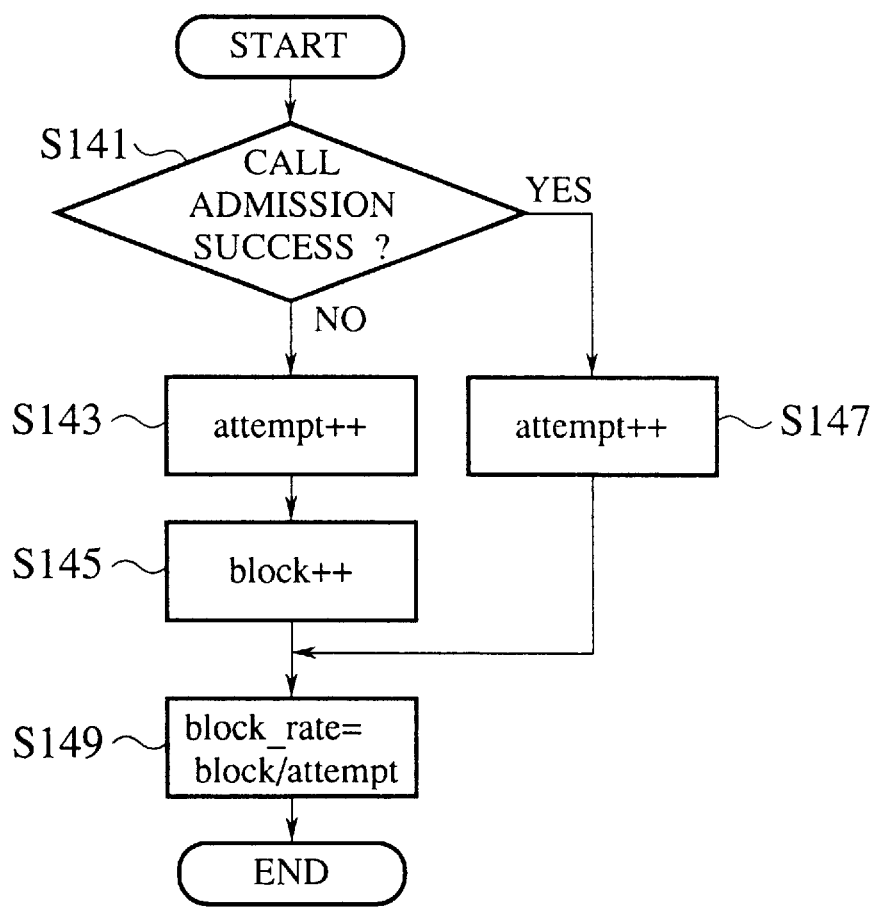
FIG. 15 is a flow chart for a blocking probability information acquisition process by a maximum number of simultaneously connectable users control device in the base station of FIG. 11, for one case.

FIG. 15 is a flow chart showing a control procedure for the blocking probability information acquisition process in a case of calculating the blocking probability by measuring a number of originated calls, a number of terminated calls, and a number of incomplete originated or terminated calls within the own radio zone.

First, according to the call admission result notice from the call admission control device 115B, whether the call admission is success or not is judged (step S141).

Then the variable "attempt" is increased by one (step S143) and the variable "block" is increased by one (step S145) when the call admission is success, whereas the variable "attempt" alone is increased by one (step S147) when the call admission is failure. Then, a value obtained by dividing "block" by "attempt" is substituted into the variable "block_rate" (step S149). This process is finished after the updated variables are stored into the memory 119B.

Figure 16:
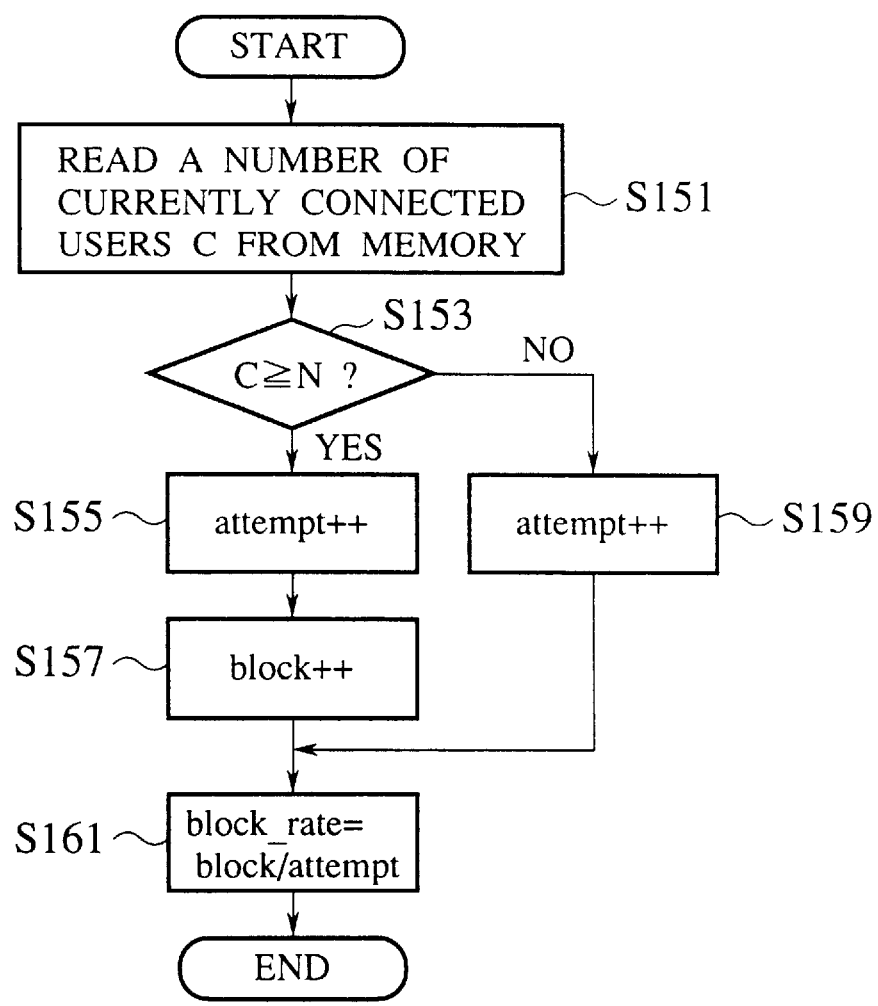
FIG. 16 is a flow chart for a blocking probability information acquisition process by a maximum number of simultaneously connectable users control device in the base station of FIG. 11, for another case.

FIG. 16 is a flow chart showing a control procedure for the blocking probability information acquisition process in a case of calculating the blocking probability by measuring the carried traffic within the own radio zone.

First, the maximum number of simultaneously connectable users control device 116 reads a number of currently connected users C from the memory 119B (step S51), and compares this number of currently connected users C with the maximum number of simultaneously connectable users N (step S153).

Then the variable "attempt" is increased by one (step S155) and the variable "block" is increased by one (step S157) when C≧N, whereas the variable "attempt" alone is increased by one (step S159) when C<N. Then, a value obtained by dividing "block" by "attempt" is substituted into the variable "block_rate" (step S161). This process is finished after the updated variables are stored into the memory 119B.

Figure 17:
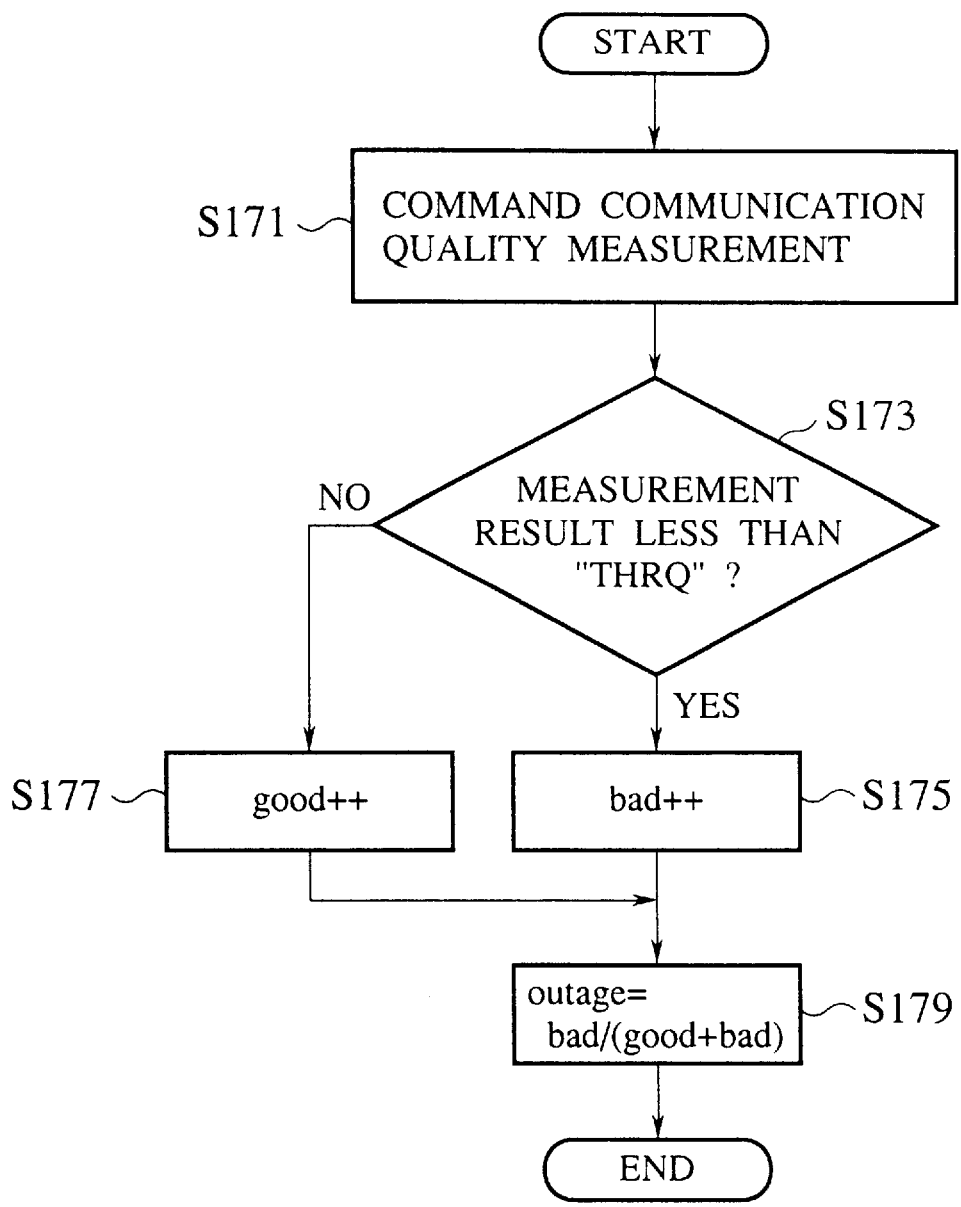
FIG. 17 is a flow chart for a communication quality information acquisition process by a maximum number of simultaneously connectable users control device in the base station of FIG. 11, for one case.

FIG. 17 is a flow charts showing a control procedure for the communication quality information acquisition process in a case of measuring the SIR (Signal to Interference power Ratio) as the communication quality.

First, the maximum number of simultaneously connectable users control device 116 commands the communication channel control device 125 to carry out the communication quality measurement (step S171). Then, according to the response from the communication channel control device 125, the measurement result is compared with "THRQ" (step S173).

When the measurement result is less than "THRQ", it is judged as a case of quality degradation, and the variable "bad" is increased by one (step S175). On the other hand, when the measurement result is greater than or equal to "THRQ", it is judged as a case of satisfactory communication quality, and the variable "good" is increased by one (step S177).

Then, a value obtained by dividing "bad" by ("good" + "bad") is substituted into the variable "outage" (step S179). This process is finished after the updated variables are stored into the memory 119B.

Figure 18:
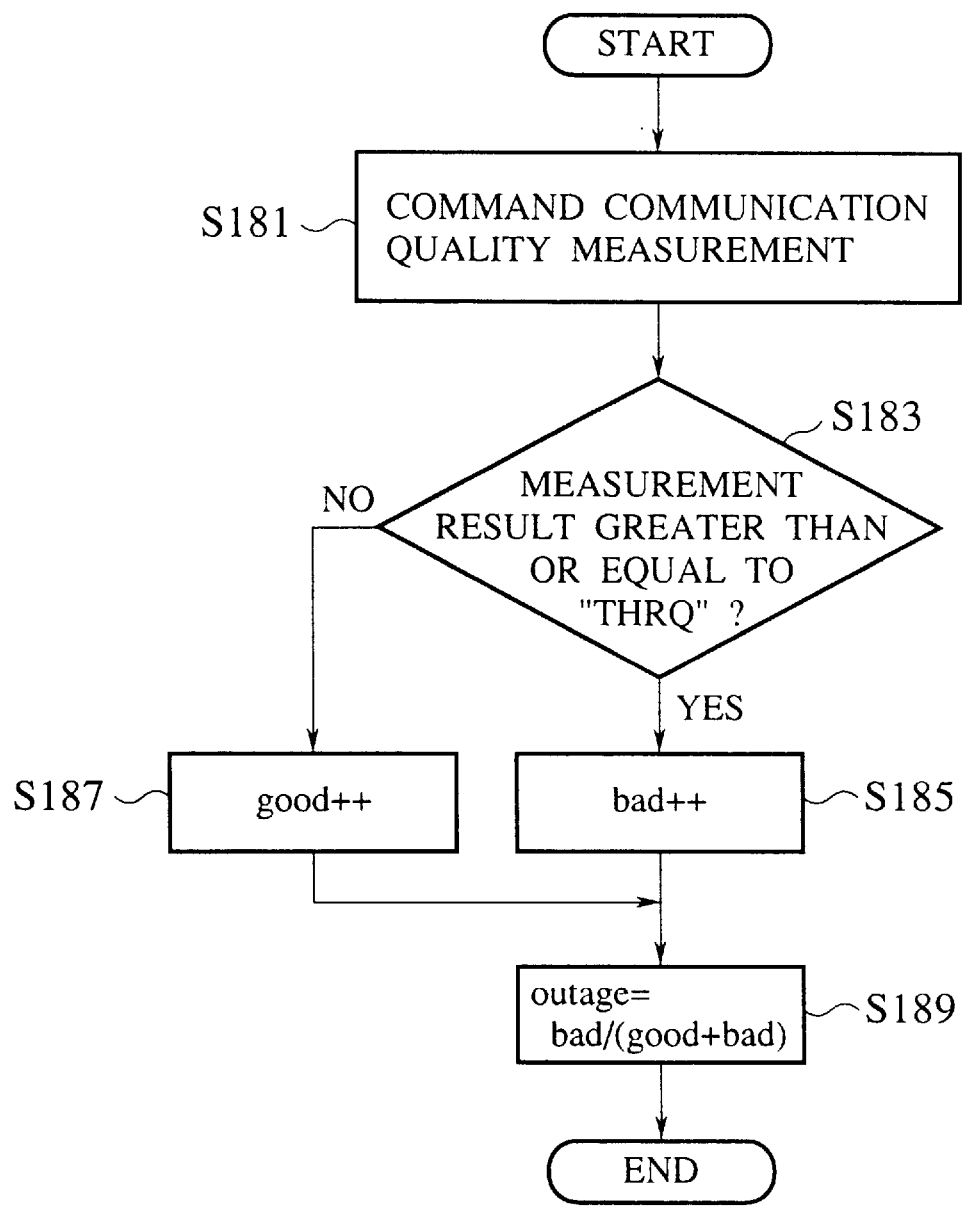
FIG. 18 is a flow chart for a communication quality information acquisition process by a maximum number of simultaneously connectable users control device in the base station of FIG. 11, for another case.

FIG. 18 is a flow charts showing a control procedure for the communication quality information acquisition process in a case of measuring the interference power level as the communication quality.

First, the maximum number of simultaneously connectable users control device 116 commands the communication channel control device 125 to carry out the communication quality measurement (step S181). Then, according to the response from the communication channel control device 125, the measurement result is compared with "THRQ" (step S183).

When the measurement result is greater than or equal to "THRQ", it is judged as a case of quality degradation, and the variable "bad" is increased by one (step S185). On the other hand, when the measurement result is less than "THRQ", it is judged as a case of satisfactory communication quality, and the variable "good" is increased by one (step S187).

Then, a value obtained by dividing "bad" by ("good" + "bad") is substituted into the variable "outage" (step S189). This process is finished after the updated variables are stored into the memory 119B.

Note that, at a time of the communication quality information acquisition, it is also possible to acquire the communication quality information for the downward link by commanding the execution of the communication quality measurement at the user terminal 13 from the maximum number of simultaneously connectable users control device 116 through the communication channel control device 125.

Figure 19:
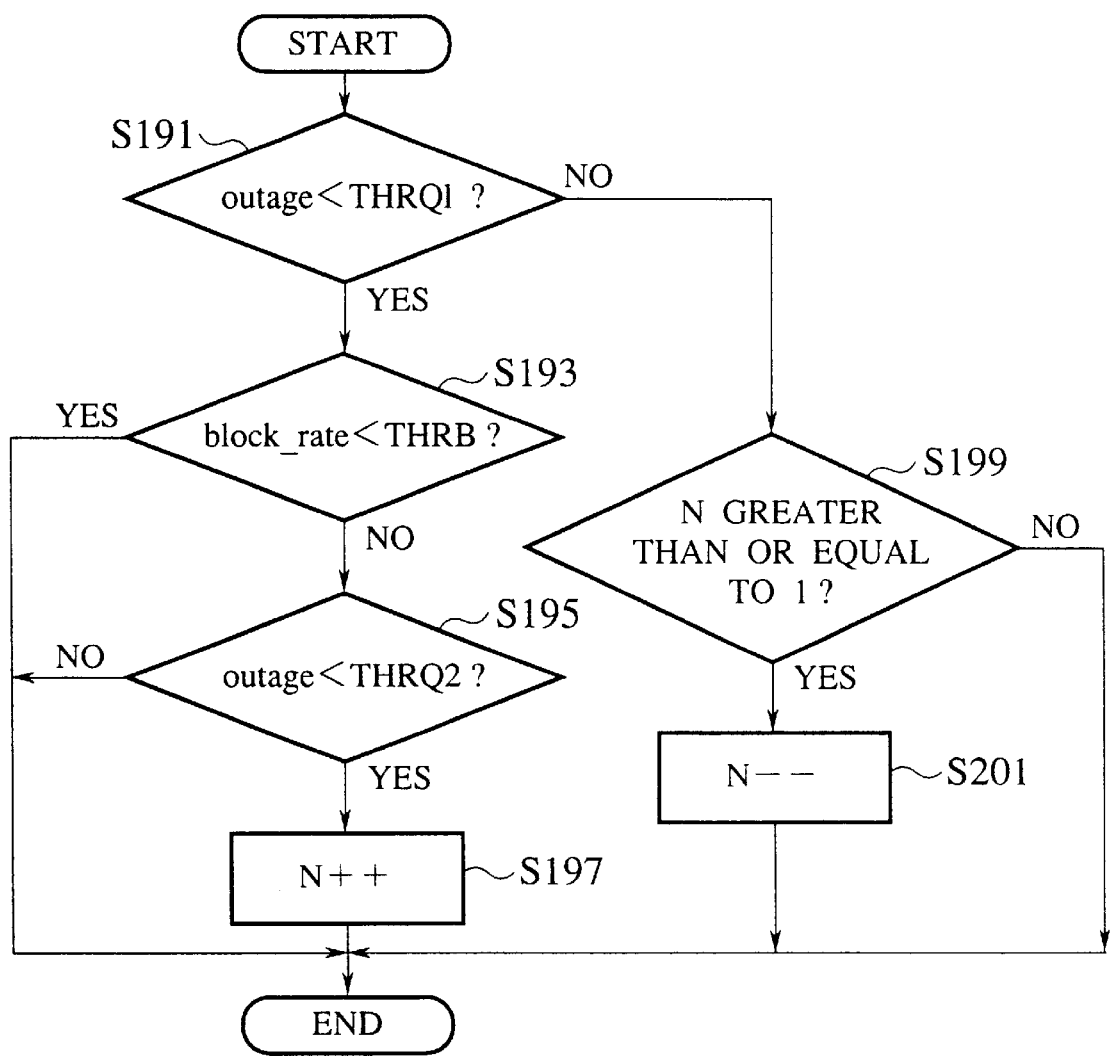
FIG. 19 is a flow chart for a maximum number of simultaneously connectable users update process by a maximum number of simultaneously connectable users control device in the base station of FIG. 11.

FIG. 19 is a flow charts showing a control procedure for the maximum number of simultaneously connectable users update process.

First, the maximum number of simultaneously connectable users control device 116 reads the variables "outage" and "block_rate", and the constants "THRQ1", "THRQ2" and "THRB" from the memory 119B.

Then, when the variable "outage" is greater than or equal to the constant "THRQ1" (step S191 NO) and the variable "N" is greater than or equal to 1 (step S199 YES), the variable "N" is decreased by one (step S201) and the process is finished. When the variable "N" is less than 1 (step S199 NO), the process is finished at this point.

On the other hand, when the variable "outage" is less than the constant "THRQ1" (step S191 YES), the variable "block_rate" and the constant "THRB" are compared (step S193). Then, when the variable "block_rate" is less than the constant "THRB" (step S193 YES), the process is finished at this point. When the variable "block_rate" is greater than or equal to the constant "THRB" (step S193 NO), the variable "outage" and the constant "THRQ2" are compared (step S195). Then, when the variable "outage" is less than the constant "THRQ2" (step S195 YES), the variable "N" is increased by one (step S197) and the process is finished. When the variable "outage" is greater than or equal to the constant "THRQ2" (step S195 NO), the process is finished at this point.

Note that the control procedure of FIG. 19 checks the value of the variable "N" before decreasing the variable "N" such that the variable "N" always takes a non-negative integer value. In a similar manner, it is also possible to check the value of the variable "N" before increasing the variable "N" such that the variable "N" does not take an excessively large value. In such a case, the maximum value of the variable "N" is determined in advance, and the variable "N" is increased only when it is confirmed that the current value of the variable "N" is less than this predetermined maximum value.

Note also that the control procedure of FIG. 19 compares the variable "outage" with both constants "THRQ1" and "THRQ2" before the variable "N" is increased, for the following two reasons. One reason is to suppress an oscillation of the control in which the decrease of the variable "N" becomes necessary soon after the variable "N" is increased. Namely, when the variable "N" is increased at the step S197, the blocking probability decreases but the outage probability of communication quality increases for the same offered calls. But then, if this step S197 is carried out without the step S195, the outage probability of communication quality would exceed "THRQ1" soon so that it would become necessary to decrease the variable "N" at the step S201 soon after the variable "N" is increased at the step S197. It is preferable to suppress this type of oscillation of the control. Another reason is to give a higher priority to the outage probability of communication quality than the blocking probability. Namely, the decrease of the variable "N" which suppresses the outage probability of communication quality should preferably be done quickly, but the increase of the variable "N" which suppresses the blocking probability but increases the outage probability of communication quality should preferably be done rather cautiously.

When the maximum number of simultaneously connectable users update process is finished as described above, the maximum number of simultaneously connectable users control device 116 makes transition to the communication quality information and blocking probability information update state T9. In this state T9, the variables "attempt", "block", "block_rate", "good", "bad", and "outage" as updated in the communication quality information acquisition state T5 and the blocking probability information acquisition state T3 and stored in the memory 119B are initialized or updated. Some concrete examples of the processing that can be carried out in this state T9 include the following:

(1) A processing to substitute a value 0 into every one of the variables "attempt", "block", "block_rate", "good", "bad", and "outage".

(2) A processing to substitute a value 0 into every one of the variables "attempt", "block", "block_rate", "good", "bad", and "outage" every time a recorded number of transitions to the maximum number of simultaneously connectable users update process reaches M times (where M is a prescribed integer greater than 1).

(3) A processing to update the variables using a real number $\lambda$ ($0<\lambda<1$) as follows:

$$\text{attempt} = \text{attempt} \times \lambda$$
$$\text{block} = \text{block} \times \lambda$$
$$\text{good} = \text{good} \times \lambda$$
$$\text{bad} = \text{bad} \times \lambda$$

Note that a choice of the actual processing to be carried out in this state T9 does not affect the effects realizable by the call admission control scheme of this third embodiment.

According to this third embodiment, the maximum number of simultaneously connectable users is determined according to the blocking probability information and the communication quality information acquired at each base station. The call admission/rejection judgement is made according to this maximum number of simultaneously connectable users, so that the call admission control can be realized by means of a very simple control. Moreover, the maximum number of simultaneously connectable users is determined as a value which satisfies the prescribed blocking probability and outage probability of communication quality, so that it is possible to operate the system in a manner which satisfies the prescribed blocking probability and outage probability of communication quality. In addition, the call admission control of this third embodiment is realized by the distributed autonomous control at each base station, so that it has a very high adaptability with respect to the system expansion, and therefore it is possible to realize the flexible system design and operation.

It is to be noted that, in the above description, it is assumed that each base station uses a frequency bandwidth shared by a plurality of user for each of an upward link and a downward link, and that all the base stations use the identical frequency bandwidth, for the sake of explanation. However, the mobile communication system according to this second embodiment is not to be limited by these assumptions. Namely, it is possible to realize the similar effects in a case of using a plurality of frequency bandwidths at each base station, by applying the call admission control scheme of this third embodiment repeatedly to each frequency bandwidth involved.

In addition, this third embodiment is applicable to a case in which the frequency bandwidths used by the base stations are not necessary identical, and the similar effects as described above can also be realized in such a case.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of call admission control in a CDMA mobile communication system having a plurality of base stations and mobile stations, the method comprising the steps of:

calculating at each base station a blocking probability and an outage probability of communication quality within a radio zone of each base station;

adjusting at each base station a maximum number of simultaneously connectable users within a radio zone of each base station according to the blocking probability and the outage probability of communication quality calculated at the calculating step; and carrying out at each base station a call admission control for each new call occurred within a radio zone of each base station according to the maximum number of simultaneously connectable users adjusted at the adjusting step.

2. The method of claim 1, wherein the calculating step calculates the blocking probability according to a number of originated calls, a number of terminated calls, and a number of incomplete originated or terminated calls which are measured within a radio zone of each base station.

3. The method of claim 1, wherein the calculating step calculates the blocking probability according to a number of currently connected users measured within a radio zone of each base station.

4. The method of claim 1, wherein the calculating step calculates the outage probability of communication quality according to a signal to interference power ratio measured within a radio zone of each base station.

5. The method of claim 1, wherein the calculating step calculates the outage probability of communication quality according to an interference power level measured within a radio zone of each base station.

6. The method of claim 1, wherein the adjusting step decreases the maximum number of simultaneously connectable users within a radio zone of each base station when the outage probability of communication quality calculated at the calculating step is greater than a prescribed threshold for the outage probability of communication quality.

7. The method of claim 1, wherein the adjusting step increases the maximum number of simultaneously connectable users within a radio zone of each base station when the blocking probability calculated at the calculating step is greater than a prescribed threshold for the blocking probability and the outage probability of communication quality calculated at the calculating step is not greater than a prescribed threshold for the outage probability of communication quality.

8. The method of claim 1, wherein the adjusting step decreases the maximum number of simultaneously connectable users within a radio zone of each base station when the outage probability of communication quality calculated at the calculating step is greater than a prescribed first threshold for the outage probability of communication quality, and increases the maximum number of simultaneously connectable users within a radio zone of each base station when the blocking probability calculated at the calculating step is greater than a prescribed threshold for the blocking probability and the outage probability of communication quality calculated at the calculating step is not greater than a prescribed second threshold for the outage probability of communication quality, where the prescribed second threshold for the outage probability of communication quality is lower than the prescribed first threshold for the outage probability of communication quality.

9. The method of claim 1, wherein the calculating step calculates the blocking probability by counting a number of originated or terminated calls and a number of blocked calls, and setting the blocking probability equal to the counted number of blocked calls divided by the counted number of originated or terminated calls.

10. The method of claim 1, wherein the calculating step calculates the outage probability of communication quality by measuring a communication quality, judging whether the communication quality is degraded or not according to a prescribed threshold, counting a first number indicating a number of times for judging that a communication quality is degraded and a second number indicating a number of times for judging that a communication quality is not degraded, and setting the outage probability of communication quality equal to the first number divided by a sum of the first number and the second number.

11. The method of claim 1, wherein the carrying out step admits a connection of each new call when a number of currently connected users is less than the maximum number of simultaneously connectable users adjusted at the adjusting step, and rejects a connection of each new call otherwise.

12. An apparatus for call admission control in a CDMA mobile communication system having a plurality of base stations and mobile stations, the apparatus comprising:

first control means, provided at each base station, for calculating a blocking probability and an outage probability of communication quality within a radio zone of each base station, and adjusting a maximum number of simultaneously connectable users within a radio zone of each base station according to the calculated blocking probability and outage probability of communication quality; and second control means, provided at each base station, for carrying out a call admission control for each new call occurred within a radio zone of each base station according to the maximum number of simultaneously connectable users adjusted by the first control means.

13. The apparatus of claim 12, wherein the first control means calculates the blocking probability according to a number of originated calls, a number of terminated calls, and a number of incomplete originated or terminated calls which are measured within a radio zone of each base station.

14. The apparatus of claim 12, wherein the first control means calculates the blocking probability according to a number of currently connected users measured within a radio zone of each base station.

15. The apparatus of claim 12, wherein the first control means calculates the outage probability of communication quality according to a signal to interference power ratio measured within a radio zone of each base station.

16. The apparatus of claim 12, wherein the first control means calculates the outage probability of communication quality according to an interference power level measured within a radio zone of each base station.

17. The apparatus of claim 12, wherein the first control means decreases the maximum number of simultaneously connectable users within a radio zone of each base station when the calculated outage probability of communication quality is greater than a prescribed threshold for the outage probability of communication quality.

18. The apparatus of claim 12, wherein the first control means increases the maximum number of simultaneously connectable users within a radio zone of each base station when the calculated blocking probability is greater than a prescribed threshold for the blocking probability and the calculated outage probability of communication quality is not greater than a prescribed threshold for the outage probability of communication quality.

19. The apparatus of claim 12, wherein the first control means decreases the maximum number of simultaneously connectable users within a radio zone of each base station when the calculated outage probability of communication quality is greater than a prescribed first threshold for the outage probability of communication quality, and increases the maximum number of simultaneously connectable users within a radio zone of each base station when the calculated blocking probability is greater than a prescribed threshold for the blocking probability and the calculated outage probability of communication quality is not greater than a prescribed second threshold for the outage probability of communication quality, where the prescribed second threshold for the outage probability of communication quality is lower than the prescribed first threshold for the outage probability of communication quality.

20. The apparatus of claim 12, wherein the first control means calculates the blocking probability by counting a number of originated or terminated calls and a number of blocked calls, and setting the blocking probability equal to the counted number of blocked calls divided by the counted number of originated or terminated calls.

21. The apparatus of claim 12, wherein the first control means calculates the outage probability of communication quality by measuring a communication quality, judging whether the communication quality is degraded or not according to a prescribed threshold, counting a first number indicating a number of times for judging that a communication quality is degraded and a second number indicating a number of times for judging that a communication quality is not degraded, and setting the outage probability of communication quality equal to the first number divided by a sum of the first number and the second number.

22. The apparatus of claim 12, wherein the second control means admits a connection of each new call when a number of currently connected users is less than the maximum number of simultaneously connectable users adjusted by the first control means, and rejects a connection of each new call otherwise.

23. A method of call admission control in a CDMA mobile communication system having a plurality of base stations and mobile stations, the method comprising the steps of:

obtaining a maximum offered traffic for satisfying a prescribed blocking probability while guaranteeing a prescribed communication quality, from a first relationship between an offered traffic and a maximum number of simultaneously connectable users for guaranteeing the prescribed communication quality and a second relationship between an offered traffic and a maximum number of simultaneously connectable users for satisfying the prescribed blocking probability;

determining a maximum number of simultaneously connectable users for satisfying the prescribed blocking probability with respect to a given offered traffic not greater than the maximum offered traffic obtained at the obtaining step, from the second relationship; and carrying out a call admission control for each new call according to the maximum number of simultaneously connectable users determined at the determining step.

24. The method of claim 23, wherein the obtaining step uses the first relationship derived by guaranteeing a prescribed outage probability of communication quality.

25. The method of claim 24, wherein an outage probability of communication quality $P_{loss}$ is given by:

$$P_{loss}=$$

where N is a maximum number of simultaneously connectable users, $P_k$ is a probability for k users to be in a speech state within a cell of each base station, $c_{max}$ is a limit value for Judging degradation of communication quality from a total sum of an interference from other users in a speech state within a cell of each base station and an interference from other cells of other base stations, $P_{int}$ (m) is a probability density distribution of an interference from other cells of other base stations, and m is a converted number of users at each base station equivalent to an interference from other cells of other base stations.

26. The method of claim 23, wherein the obtaining step and the determining step use the second relationship derived from Erlang's B formula.

27. The method of claim 23, wherein the obtaining step obtains the maximum offered traffic as an offered traffic value corresponding to an intersection of a curve expressing the first relationship and a straight line expressing the second relationship.

28. The method of claim 23, wherein the determining step determines the maximum number of simultaneously connectable users as a maximum number of simultaneously connectable users value corresponding to the given offered traffic on a straight line expressing the second relationship.

29. The method of claim 23, wherein the carrying out step admits a connection of each new call when a number of currently connected users is less than the maximum number of simultaneously connectable users determined at the determining step, and rejects a connection of each new call otherwise.

30. A method of call admission control in a CDMA mobile communication system having a plurality of base stations and mobile stations, the method comprising the steps of:

obtaining a maximum offered traffic for satisfying a prescribed blocking probability while guaranteeing a prescribed communication quality, from a first relationship between an offered traffic and an interference threshold for guaranteeing the prescribed communication quality and a second relationship between an offered traffic and an interference threshold for satisfying the prescribed blocking probability;

determining an interference threshold for satisfying the prescribed blocking probability with respect to a given offered traffic not greater than the maximum offered traffic obtained at the obtaining step, from the second relationship; and carrying out a call admission control for each new call according to the interference threshold determined at the determining step.

31. The method of claim 30, wherein the obtaining step uses the first relationship derived by guaranteeing a prescribed outage probability of communication quality.

32. The method of claim 31, wherein an outage probability of communication quality $P_{loss}$ is given by:

$$P_{loss}=$$

where $P_k$ is a probability for k users to be in a speech state within a cell of each base station, $C_{max}$ is a limit value for judging degradation of communication quality from a total sum of an interference from other users in a speech state within a cell of each base station and an interference from other cells of other base stations, $P_{int}$ (m) is a probability density distribution of an interference from other cells of other base stations, and m is a converted number of users at each base station equivalent to an interference from other cells of other base stations.

33. The method of claim 30, wherein the obtaining step and the determining step use the second relationship derived from a blocking probability $P_{block}$ given by:

$$P_{block} = \sum_{r=0}^{\infty} (1 - p(r))P_r$$

where p(r) is a probability for a call to be admitted when a number of simultaneously connected users is r, and $P_r$ is a probability for the number of simultaneously connected users to be r within each base station.

34. The method of claim 30, wherein the obtaining step obtains the maximum offered traffic as an offered traffic value corresponding to an intersection of a curve expressing the first relationship and a straight line expressing the second relationship.

35. The method of claim 30, wherein the determining step determines the interference threshold as an interference threshold value corresponding to the given offered traffic on a straight line expressing the second relationship.

36. The method of claim 30, wherein the carrying out step admits a connection of each new call when a measured interference level is less than the interference threshold determined at the determining step, and rejects a connection of each new call otherwise.

37. An apparatus for call admission control in a CDMA mobile communication system having a plurality of base stations and mobile stations, the apparatus comprising:
 a memory for storing a maximum number of simultaneously connectable users, predetermined by obtaining a maximum offered traffic for satisfying a prescribed blocking probability while guaranteeing a prescribed communication quality, from a first relationship between an offered traffic and a maximum number of simultaneously connectable users for guaranteeing the prescribed communication quality and a second relationship between an offered traffic and a maximum number of simultaneously connectable users for satisfying the prescribed blocking probability, and determining a maximum number of simultaneously connectable users for satisfying the prescribed blocking probability with respect to a given offered traffic not greater than the obtained maximum offered traffic, from the second relationship; and
 call admission control means for carrying out a call admission control for each new call according to the maximum number of simultaneously connectable users stored in the memory.

38. The apparatus of claim 37, wherein the memory stores the maximum number of simultaneously connectable users determined by using the first relationship derived by guaranteeing a prescribed outage probability of communication quality.

39. The apparatus of claim 38, wherein an outage probability of communication quality $P_{loss}$ is given by:

$$P_{loss} = \frac{\sum_{k=0}^{N} kP_k \int_{c_{max}+1-k}^{\infty} p_{int}(m)dm}{\sum_{k=0}^{N} kP_k}$$

where N is a maximum number of simultaneously connectable users, $P_k$ is a probability for k users to be in a speech state within a cell of each base station, $c_{max}$ is a limit value for judging degradation of communication quality from a total sum of an interference from other users in a speech state within a cell of each base station and an interference from other cells of other base stations, $P_{int}(m)$ is a probability density distribution of an interference from other cells of other base stations, and m is a converted number of users at each base station equivalent to an interference from other cells of other base stations.

40. The apparatus of claim 37, wherein the memory stores the maximum number of simultaneously connectable users determined by using the second relationship derived from Erlang's B formula.

41. The apparatus of claim 37, wherein the memory stores the maximum number of simultaneously connectable users determined from the maximum offered traffic obtained as an offered traffic value corresponding to an intersection of a curve expressing the first relationship and a straight line expressing the second relationship.

42. The apparatus of claim 37, wherein the memory stores the maximum number of simultaneously connectable users determined as a maximum number of simultaneously connectable users value corresponding to the given offered traffic on a straight line expressing the second relationship.

43. The apparatus of claim 37, wherein the call admission control means admits a connection of each new call when a number of currently connected users is less than the maximum number of simultaneously connectable users stored in the memory, and rejects a connection of each new call otherwise.

44. An apparatus for call admission control in a CDMA mobile communication system having a plurality of base stations and mobile stations, the apparatus comprising:
 a memory for storing an interference threshold, predetermined by obtaining a maximum offered traffic for satisfying a prescribed blocking probability while guaranteeing a prescribed communication quality, from a first relationship between an offered traffic and an interference threshold for guaranteeing the prescribed communication quality and a second relationship between an offered traffic and an interference threshold for satisfying the prescribed blocking probability, and determining an interference threshold for satisfying the prescribed blocking probability with respect to a given offered traffic not greater than the obtained maximum offered traffic, from the second relationship; and
 call admission control means for carrying out a call admission control for each new call according to the interference threshold stored in the memory.

45. The apparatus of claim 44, wherein the memory stores the interference threshold determined by using the first relationship derived by guaranteeing a prescribed outage probability of communication quality.

46. The apparatus of claim 45, wherein an outage probability of communication quality $P_{loss}$ is given by:

$$P_{loss} = \frac{\sum_{k=0}^{\infty} kP_k \int_{C_{max}+1-k}^{\infty} p_{int}(m)dm}{\sum_{k=0}^{\infty} kP_k}$$

where $P_k$ is a probability for k users to be in a speech state within a cell of each base station, $c_{max}$ is a limit value for judging degradation of communication quality from a total sum of an interference from other users in a speech state within a cell of each base station and an interference from other cells of other base stations, $P_{int}(m)$ is a probability density distribution of an interference from other cells of other base stations, and m is a converted number of users at each base station equivalent to an interference from other cells of other base stations.

47. The apparatus of claim 44, wherein the memory stores the interference threshold determined by using the second relationship derived from a blocking probability $P_{block}$ given by:

$$P_{block} = \sum_{r=0}^{\infty} (1 - p(r))P_r$$

where p(r) is a probability for a call to be admitted when a number of simultaneously connected users is r, and $P_r$ is a probability for the number of simultaneously connected users to be r within each base station.

48. The apparatus of claim 44, wherein the memory stores the interference threshold determined by using the maximum offered traffic obtained as an offered traffic value corresponding to an intersection of a curve expressing the first relationship and a straight line expressing the second relationship.

49. The apparatus of claim 44, wherein the memory stores the interference threshold determined as an interference threshold value corresponding to the given offered traffic on a straight line expressing the second relationship.

50. The apparatus of claim 44, wherein the call admission control means admits a connection of each new call when a measured interference level is less than the interference threshold stored in the memory, and rejects a connection of each new call otherwise.

* * * * *